United States Patent
Bernardos et al.

(10) Patent No.: US 12,542,826 B2
(45) Date of Patent: Feb. 3, 2026

(54) METHODS, APPARATUS, AND SYSTEMS FOR ENABLING WIRELESS RELIABILITY AND AVAILABILITY IN MULTI-ACCESS EDGE DEPLOYMENTS

(71) Applicant: InterDigital Patent Holdings, Inc., Wilmington, DE (US)

(72) Inventors: Carlos Jesus Bernardos, Alcorcon (ES); Jani-Pekka Kainulainen, London (GB); Alain Mourad, Staines-Upon-Thames (GB)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/017,305

(22) PCT Filed: Jul. 22, 2021

(86) PCT No.: PCT/US2021/042725
§ 371 (c)(1),
(2) Date: Jan. 20, 2023

(87) PCT Pub. No.: WO2022/020561
PCT Pub. Date: Jan. 27, 2022

(65) Prior Publication Data
US 2023/0262117 A1    Aug. 17, 2023

Related U.S. Application Data

(60) Provisional application No. 63/055,726, filed on Jul. 23, 2020.

(51) Int. Cl.
*H04L 67/1061* (2022.01)
*H04L 67/12* (2022.01)

(52) U.S. Cl.
CPC .......... *H04L 67/1063* (2013.01); *H04L 67/12* (2013.01)

(58) Field of Classification Search
CPC ........................... H04L 67/1063; H04L 67/12
See application file for complete search history.

(56) References Cited

U.S. PATENT DOCUMENTS

| | | | |
|---|---|---|---|
| 11,134,127 B2 | 9/2021 | Lee et al. | |
| 11,700,298 B2 * | 7/2023 | White | H04L 41/0894 709/226 |

(Continued)

FOREIGN PATENT DOCUMENTS

| | | | |
|---|---|---|---|
| EP | 3503620 A1 | 6/2019 | |
| KR | 20200007754 A | 1/2020 | |
| WO | WO-2018158637 A1 * | 9/2018 | ............. G01C 21/34 |

OTHER PUBLICATIONS

ETSI MEC, "Mobile Edge Computing (MEC); Framework and Reference Architecture," ETSI GS MEC 003 V2.1.1, Jan. 2019, 21 pages.

(Continued)

*Primary Examiner* — Joe Chacko
(74) *Attorney, Agent, or Firm* — Chris Kolefas

(57) ABSTRACT

Methods, apparatus, systems, architectures and interfaces for a Multi-access Edge Computing (MEC) host providing a MEC platform, including a reliable and available wireless (RAW) control entity, are provided. A method may include any of: generating MEC application information associated with a MEC-to-RAW request according to information indicating a MEC application; transmitting, to another network entity, the MEC-to-RAW request including the MEC application information; and receiving, from the other network entity, a MEC-to-RAW response including information indicating any of: (1) a wireless communication network path, (Continued)

and (2) RAW control information associated with the wireless communication network path.

20 Claims, 16 Drawing Sheets

(56) References Cited

U.S. PATENT DOCUMENTS

| | | | | |
|---|---|---|---|---|
| 2019/0268812 | A1* | 8/2019 | Li | H04W 36/0077 |
| 2019/0319868 | A1* | 10/2019 | Svennebring | H04W 24/08 |
| 2020/0382581 | A1* | 12/2020 | Campbell | H04L 67/1021 |
| 2020/0389531 | A1* | 12/2020 | Lee | H04L 67/51 |
| 2021/0144203 | A1* | 5/2021 | Low | H04L 65/612 |
| 2021/0314811 | A1* | 10/2021 | Barton | H04L 41/40 |
| 2022/0006857 | A1* | 1/2022 | Sun | H04L 67/1031 |
| 2022/0030500 | A1* | 1/2022 | Shibata | H04L 45/02 |
| 2023/0068386 | A1* | 3/2023 | Akdeniz | G06N 3/098 |
| 2023/0362082 | A1* | 11/2023 | Svennebring | H04L 41/147 |

OTHER PUBLICATIONS

ETSI White Paper No. 28, MEC in 5G Networks, First edition, Jun. 2018, 28 pages.

CJ Bernardos UC3M A Mourad Interdigital: "Extensions to enable wireless reliability and availability in multi-access edge deployments; draft-bernardos-raw-mec-00.txt", RXP015140941, Retrieved from the Internet: URL: https://tools.ietf.org/html/draft-bern ardos-raw-mec-00 , Jul. 2020, 16 pages.

G. Tsirtsis et al., "Traffic Selectors for Flow Bindings," RFC 6088, Jan. 2011, 13 pages.

P. Bellavista et al.: "Multi Layer Routing in SDN-enabled Fog Environments", IEEE International Conference on Communications (ICC), IEEE, Jun. 7, 2020, XP033798300, 7 pages.

C.J. Bernardos, "RAW use cases," draft-bernardos-raw-use-cases-02, Mar. 2020, 22 pages.

P. Thubert, "Reliability and Available Wireless Architecture/Framework," draft-pthubert-raw-architecture-03, May 2020, 28 pages.

J. Farkas, "5G—Ultra-Reliable Wireless Technology with Low Latency," draft-farkas-raw-5g-00, Mar. 2020, 14 pages.

* cited by examiner

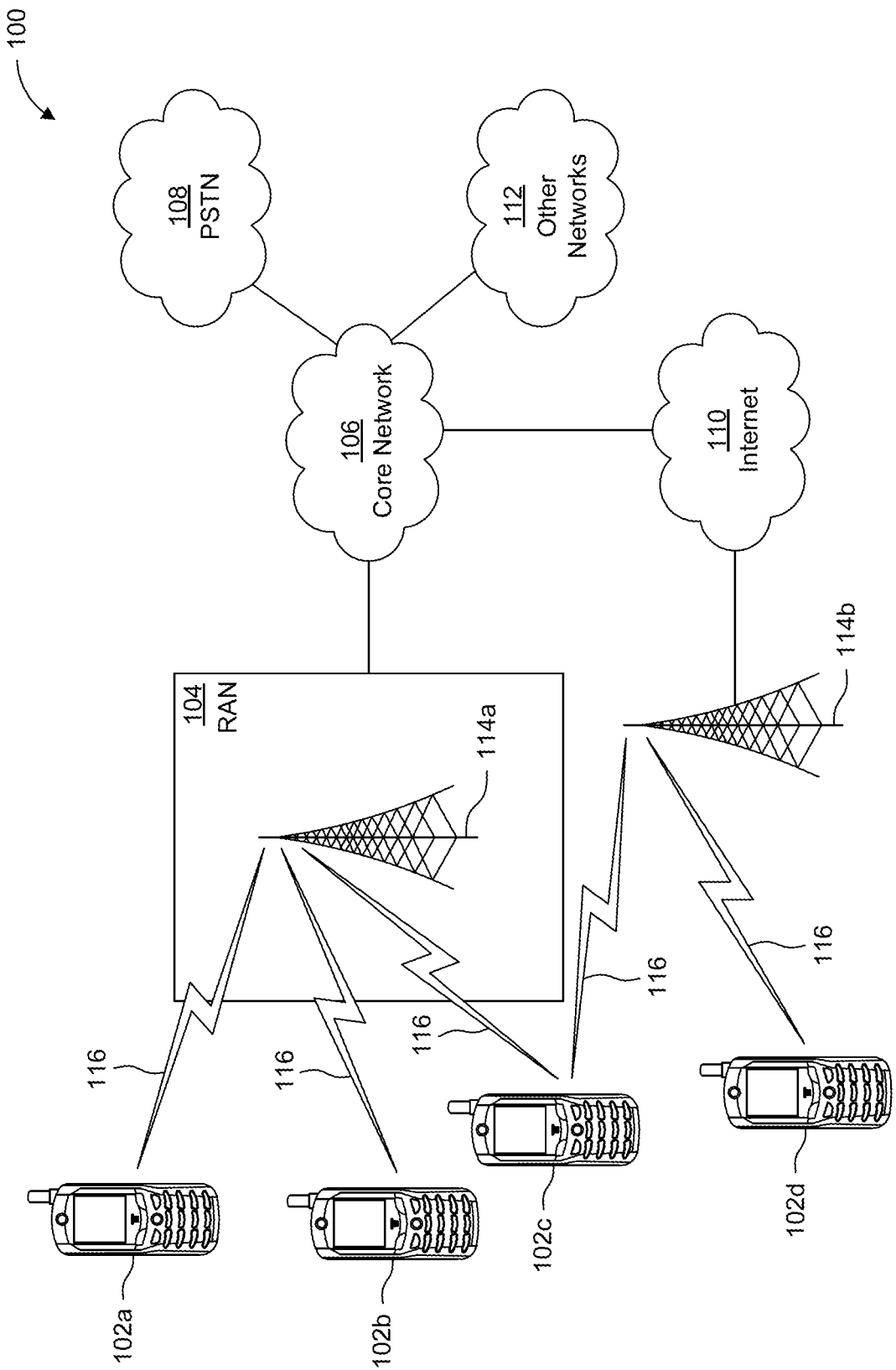

METHODS, APPARATUS, AND SYSTEMS FOR ENABLING WIRELESS RELIABILITY AND AVAILABILITY IN MULTI-ACCESS EDGE DEPLOYMENTS

CROSS REFERENCE TO RELATED APPLICATIONS

This application is a U.S. National Stage Application under 35 U.S.C. § 371 of International Patent Application No. PCT/US2021/042725, filed 22 Jul. 2021, which is incorporated herein by reference in its entirety.

This application claims the benefit of U.S. provisional patent application No. 63/055,726 filed 23 Jul. 2020, which is incorporated by reference herein in their entirety.

BACKGROUND

The present invention relates to the field of computing and communications and, more particularly, to methods, apparatus, systems, architectures and interfaces for computing and communications in an advanced or next generation wireless communication system, including communications carried out using a new radio and/or new radio (NR) access technology and communication systems. Such NR access and technology, which may also be referred to as 5G networks and technology, and/or other similar wireless communication systems and technology may include capabilities for Multi-access Edge Computing (MEC), for example, such as that discussed in or by the European Telecommunications Standards Institute (ETSI) Industry Specification Group (ISG) MEC working group.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1A is a system diagram illustrating an example communications system in which one or more disclosed embodiments may be implemented;

DETAILED DESCRIPTION

Figure 1B:
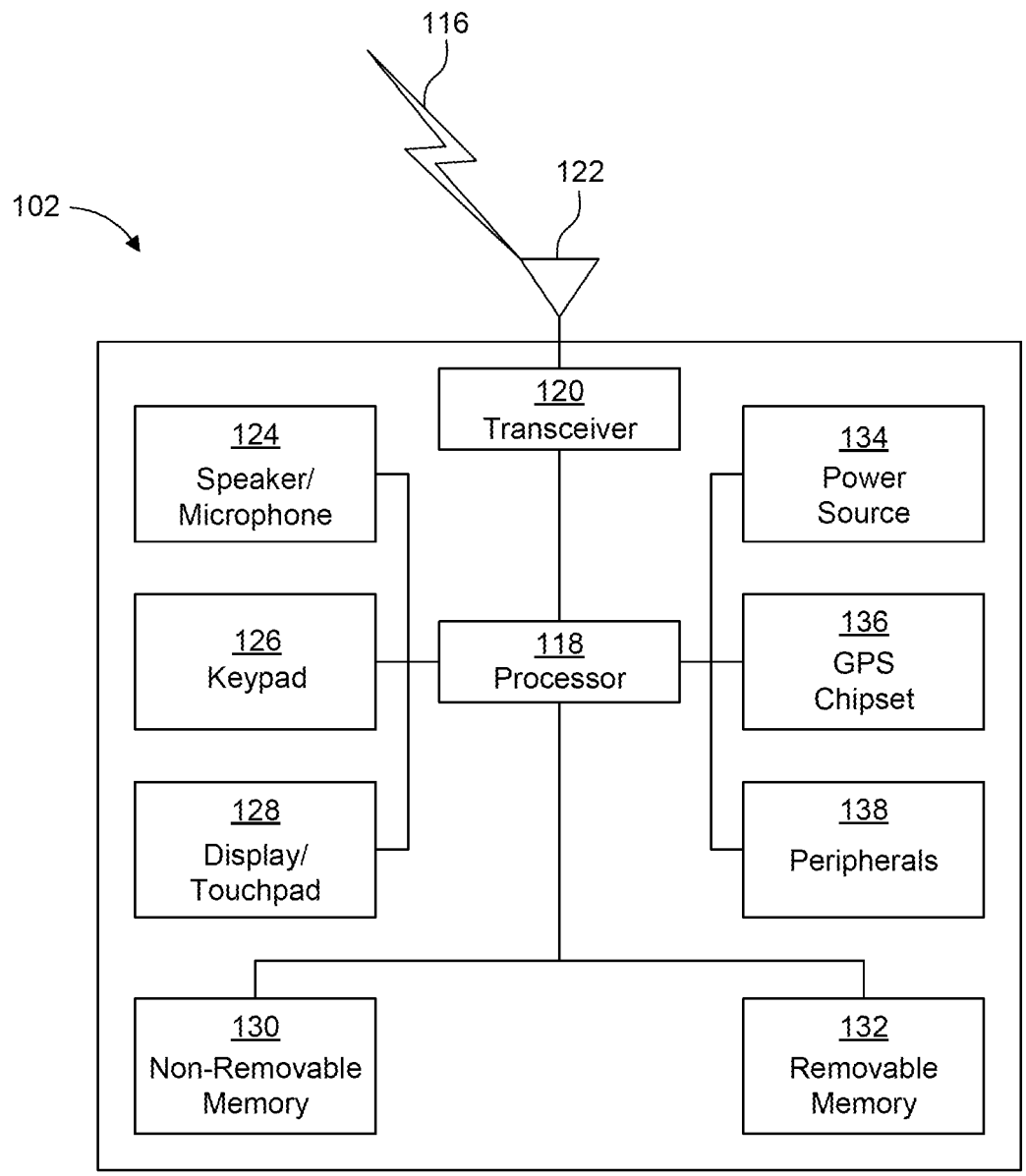
FIG. 1B is a system diagram illustrating an example wireless transmit/receive unit (WTRU) that may be used within the communications system illustrated in FIG. 1A according to an embodiment.

Example Networks for Implementation of the Embodiments

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
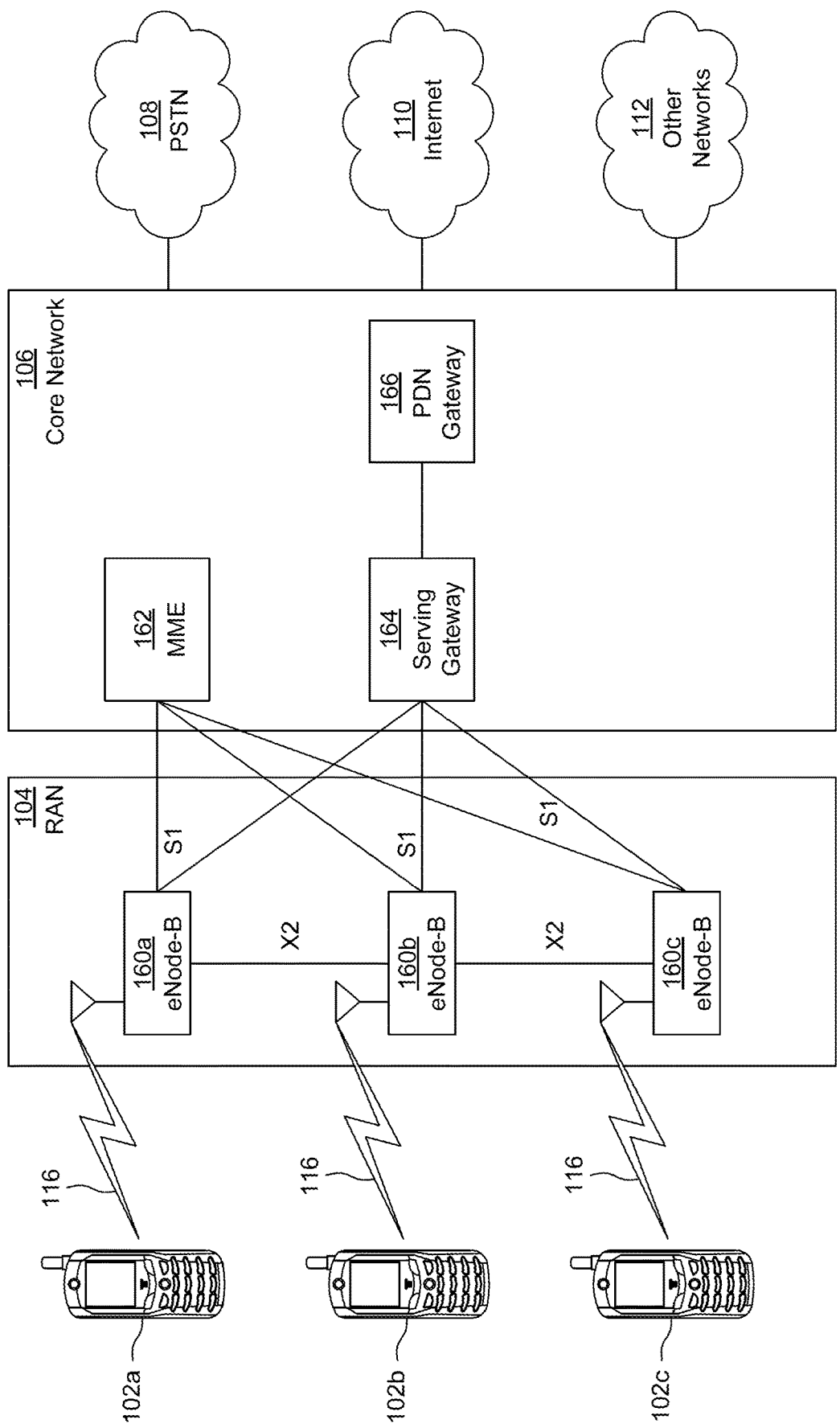
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
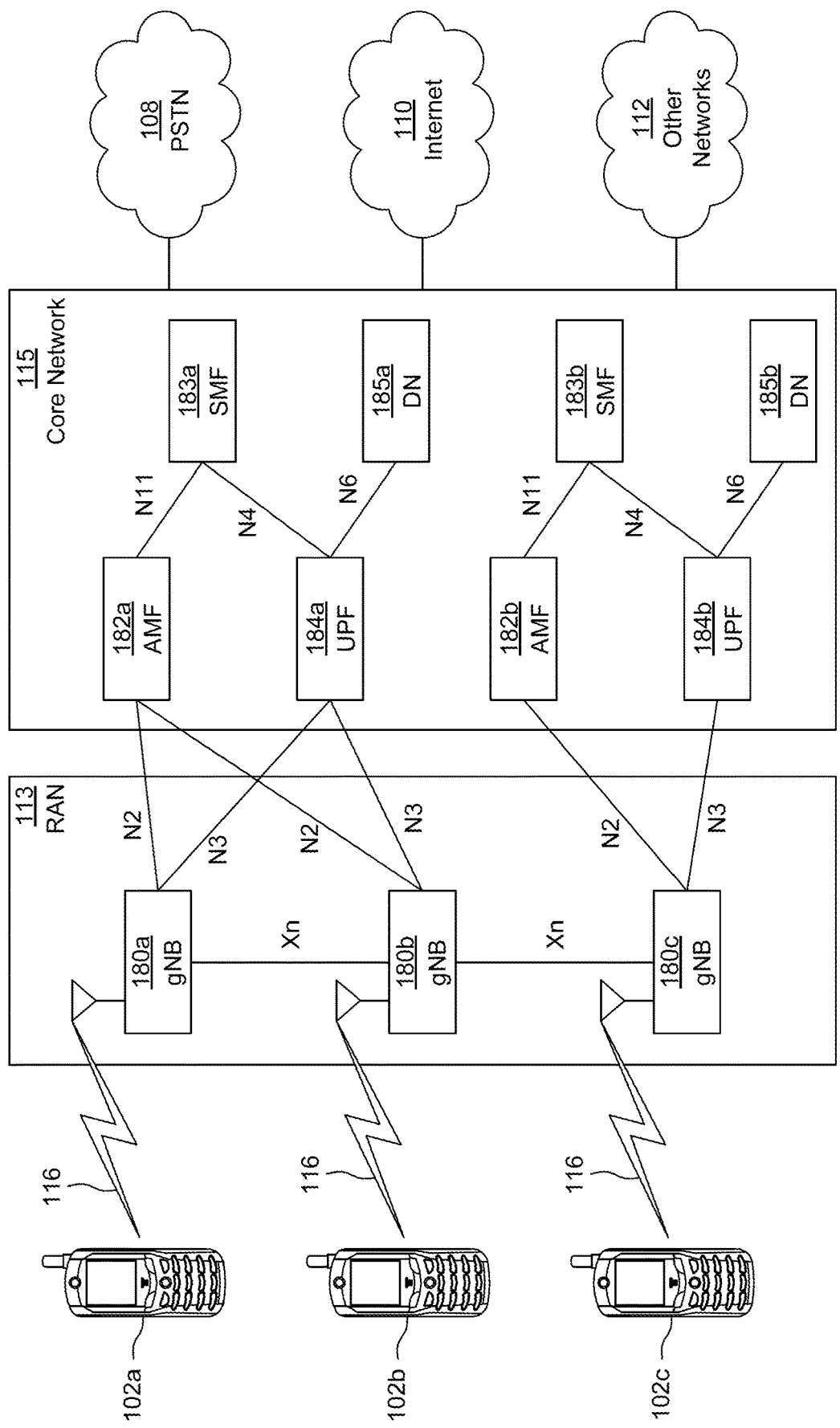
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Multi-Access Edge Computing

Figure 2:
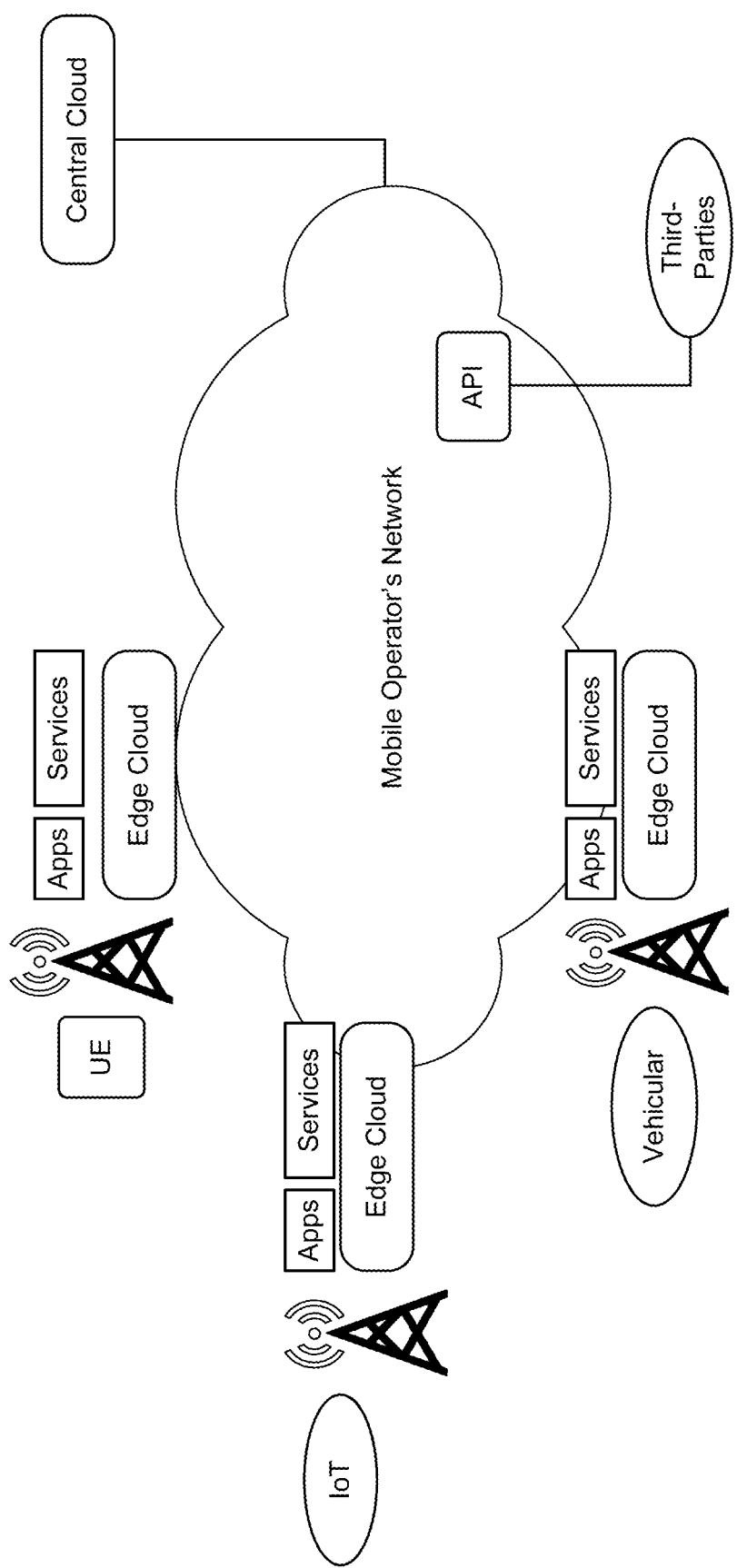
FIG. 2 is a diagram illustrating a Multi-access Edge Computing (MEC) concept, according to embodiments.
Figure 3:
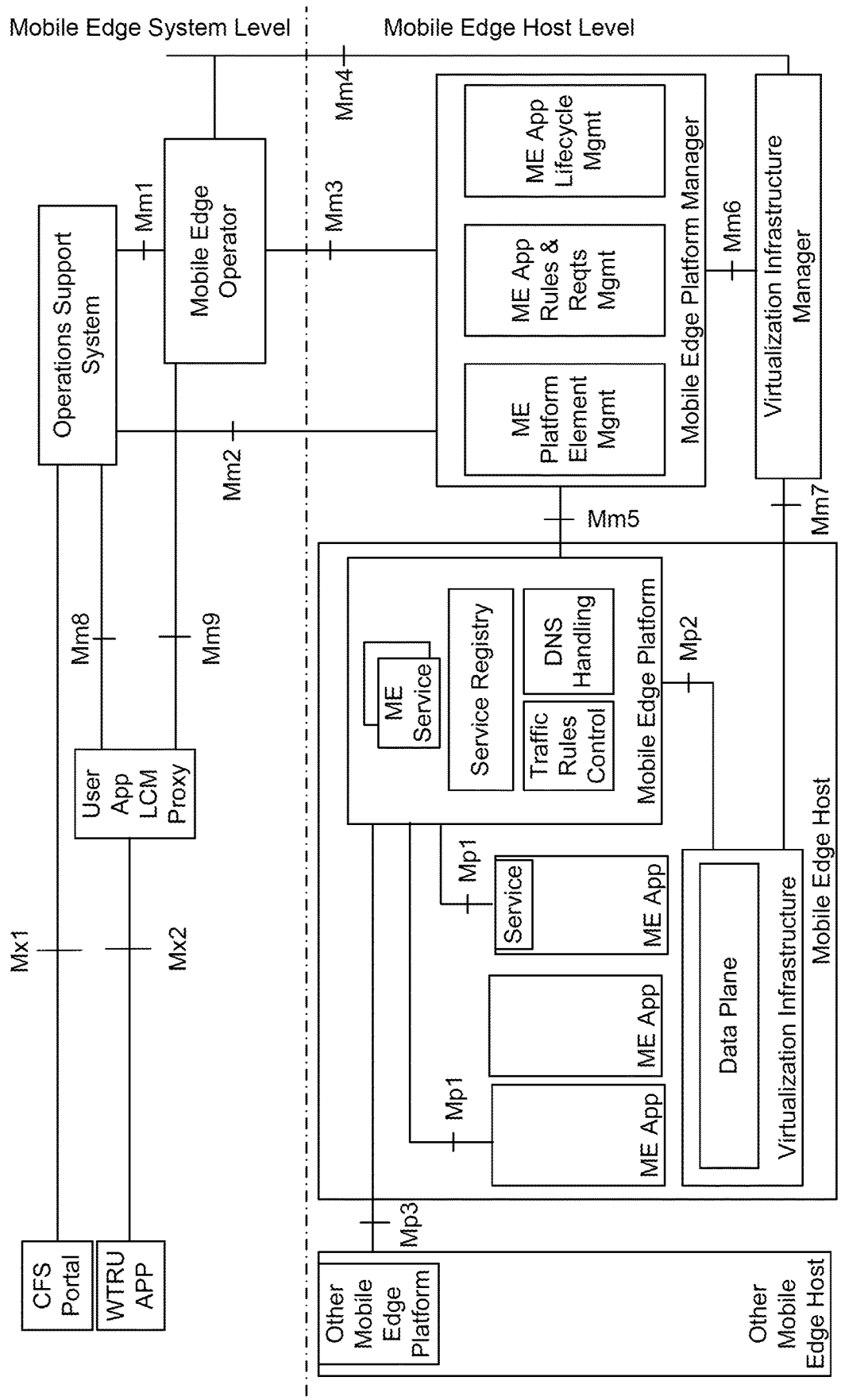
FIG. 3 is a diagram illustrating an ETSI MEC reference architecture, according to embodiments

FIG. 2 is a diagram illustrating a Multi-access Edge Computing (MEC) concept, according to embodiments; and FIG. 3 is a diagram illustrating an ETSI MEC reference architecture, according to embodiments.

MEC, which may be interchangeably referred to as Mobile Edge Computing, may include capabilities deployed at an edge of a (e.g., mobile) network, and may facilitate efficient and/or dynamic provision of services to mobile users. The European Telecommunications Standards Institute (ETSI) Industry Specification Group (ISG) MEC working group is directed to specifying an open environment for integrating MEC capabilities with service providers' networks, including, for example, capabilities associated with applications from or of 3rd parties, for example, as shown in FIG. 2. Distributed computing capabilities, such as those included in and/or provided by MEC, make available IT infrastructure, as in a cloud environment or network, for the deployment of functions in mobile access networks. The ETSI MEC reference architecture, including functional elements of the mobile edge system and reference points between them, are illustrated in FIG. 3. For example, as shown in FIG. 3, the reference points may be any of: (1) an Mp reference point associated with mobile edge platform functionality, (2) an Mm management reference points, and (3) an Mx reference point connecting to external entities.

A mobile edge system may include any number of mobile edge hosts and mobile edge management (e.g., used, necessary, etc.) for running mobile edge applications within an operator network or a subset of an operator network.

A mobile edge host may be an entity containing (e.g., including, having, etc.) a mobile edge platform and a virtualization infrastructure, for example, for providing compute, storage, and network resources, associated with running mobile edge applications. A mobile edge platform may be a collection of (e.g., essential) functions/functionalities used (e.g., needed, required) for running mobile edge applications on a (e.g., particular) virtualization infrastructure and enabling the applications to provide and consume mobile edge services. Mobile edge applications may be instantiated on (e.g., using, via, etc.) a virtualization infrastructure of the mobile edge host, for example, according to configuration requests validated by a mobile edge management.

Mobile edge management may include any of mobile edge system level management and mobile edge host level management. Mobile edge system level management may include a mobile edge orchestrator component (e.g., entity), for example, as a core component having an overview of a (e.g., complete) mobile edge system. Mobile edge host level management may include any of a mobile edge platform manager and a virtualization infrastructure manager, and may handle management of mobile edge (e.g., specific) functionality, for example, of a particular mobile edge host and the applications running on it. A work item (e.g., DGR/MEC-0036ConstrainedDevice) approved by ETSI MEC, titled "MEC in resource constrained terminals, fixed or mobile," aims at studying how terminal units, mobile hosts and personal devices can be used to support cloud computing at the edge.

Deployment of MEC in 5G

Referring to ETSI MEC ISG Whitepaper No. 28, titled "MEC in 5G networks," (e.g., see first edition, June 2018, which may be interchangeably herein referred to as the whitepaper or the ETSI MEC whitepaper), there are discussions regarding ways to deploy and integrate MEC in a 5G architecture. The whitepaper addresses: (1) opportunities for MEC to benefit from 5G edge computing enablers, and (2) opportunities for a 3GPP system/network to benefit from the MEC system and its APIs enabling applications and services environments in the edge mobile networks. The 3rd Generation Partnership Project (3GPP) design approach allows for mapping of MEC onto Application Functions (AF) that use services and information offered by (e.g., other) 3GPP network functions, for example, according to the configured policies. 3GPP has also defined a number of (e.g., enabling) functionalities providing (e.g., flexible) support for different deployments of MEC and supporting MEC in case of user mobility events.

Figure 4:
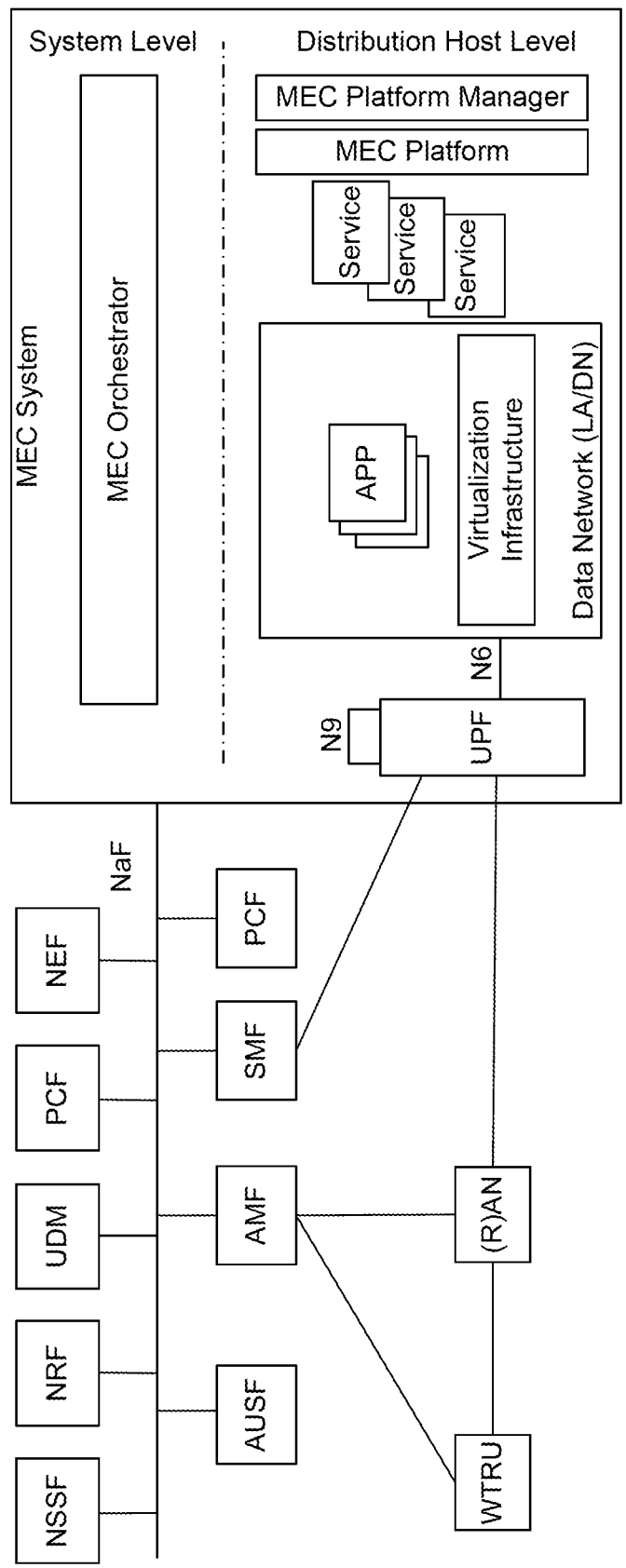
FIG. 4 is a diagram illustrating an integrated MEC deployment in a 5G network, according to embodiments.

FIG. 4 is a diagram illustrating an integrated MEC deployment in a 5th Generation (5G) network, according to embodiments.

Referring to FIG. 4, such a deployment is included in the ETSI MEC whitepaper, for example, to deploy MEC in an integrated manner with 5G, that is, in a 5G network. In the MEC system, as shown in the right-hand side of FIG. 4, a MEC orchestrator is a MEC system level functional entity that, acting as an AF, interacts with a Network Exposure Function (NEF), or (e.g., in some scenarios) directly with target 5G NFs. At a MEC host level, a MEC platform interacts with (e.g., these) 5G NFs, for example, as (e.g., in the role of) an AF. A MEC host (e.g., host level functional entities) are (e.g., most often) deployed in a data network of a 5G system. While the NEF, as a core network function, may be a system level entity deployed centrally (e.g., together) with similar NFs, an instance (e.g., an instantiation, an entity, etc.) of a NEF may also be deployed in the edge, for example, to allow low latency, high throughput service access from a MEC host. The white paper assumes that MEC is deployed on a N6 reference point, that is, in a data network external to the 5G system.

Further, the whitepaper identifies different MEC deployment scenarios. For example, (e.g., logically) MEC hosts are deployed in the edge network or central data network, and a user plane function (UPF) steers the user plane traffic towards (e.g., targeted) MEC applications in the data network. The whitepaper, as per physical deployment of MEC hosts, identifies options including any of: (1) a MEC and a local UPF collocated with a base station (BS); (2) a MEC collocated with a transmission node, possibly with a local UPF; (3) a MEC and a local UPF collocated with a network aggregation point; and (4) a MEC collocated with core network functions (e.g., in the same data center).

Reliable and Available Wireless (RAW)

Deterministic networking allows for (e.g., carrying of) specified unicast or multicast data streams for real-time applications with extremely low data loss rates and bounded latency, for example, according to any of time, resource reservation, and policy enforcement by distributed (e.g., traffic) shapers. Accordingly, deterministic networking supports time-sensitive and mission-critical applications on a converged enterprise infrastructure.

Wireless communications and/or networking (e.g., generally) operates on a shared medium (e.g., radio frequencies, over the air, wireless medium, etc.), and transmissions cannot be fully deterministic because of uncontrolled interferences, including self-induced multipath fading. In view of such, reliable and available wireless (RAW) provides deterministic networking on (e.g., through, via, over, across, etc.) a path including a wireless interface. RAW, for example, for providing deterministic networking, provides high reliability and availability for IP connectivity over a wireless medium. However, a wireless medium presents significant challenges for achieving deterministic properties, such as low packet error rate, bounded consecutive losses, and bounded latency. In view of deterministic networking (DetNet) and DetNet Working Group concepts, RAW provides for high reliability and availability for an IP network, for example, by using scheduled wireless segments and other media (e.g., see/such as: frequency/time-sharing physical media resources with stochastic traffic, time-slotted channel hopping (TSCH), 3GPP 5G ultra-reliable low latency communications (URLLC), IEEE 802.11ax/be, and L-band Digital Aeronautical Communications System (LDACS), etc.)

RAW (e.g., technologies, concepts, standards, etc.), for example, in a manner similar to DetNet, should be (e.g., is intended to be, aims at staying, etc.) abstract to radio layers underneath, for example, by addressing Layer 3 aspects in support of applications requiring high reliability and availability. RAW (e.g., conventionally) separates a path computation time scale, at which a complex path is recomputed, from the path selection time scale, at which the forwarding decision is taken for one or a few packets. Accordingly, RAW operates at a path selection time scale. Thus, RAW may (e.g., needs to, should, must, etc.) determine, from among redundant solutions proposed by a patch computation element (PCE), which (e.g., one) solutions will be used for each packet to provide a reliable and available service while minimizing waste of constrained resources. RAW defines, for example, for such a determination, a path selection engine (PSE), that is a counter-part of a PCE, for performing rapid local adjustments of the forwarding tables within the diversity that a PCE has selected for a track (e.g., available path). A PSE provides (e.g., enables exploiting of) richer forwarding capabilities using any of: (1) packet (hybrid) ARQ, replication, elimination, and ordering (PAREO), and (2) scheduled transmissions at a faster time scale.

In a wireless network, such as a 5G radio access network (RAN), quality of service (QoS) flows may be considered (e.g., handled) as data radio bearers or logical channels, for example, in a media access control (MAC) layer, such as a new radio (NR) MAC layer. In such a case, a base station, such as a gNB, may dynamically assign downlink (DL) and uplink (UL) radio resources to users, indicating the resources as DL assignments or UL grants via a control channel(s) to WTRUs. In such a case, that is, in 5G networks, radio resources are defined as blocks of OFDM symbols in any of a spectral domain and a time domain, with different lengths being supported in the time domain (e.g., (multiple) slot or mini-slot lengths). Resources of multiple frequency carriers may be aggregated and jointly scheduled, for example, for/to a WTRU. Scheduling decisions may be made, for example, based on a channel quality measured on reference signals and reported by the WTRU (e.g., via (periodic) channel state information (CSI) reports for DL channel quality).

A transmission reliability may be determined (e.g., selected, chosen, etc.) using (e.g., in) a scheduling algorithm, for example, using/by link adaptation, where an appropriate transmission format (e.g., robustness of modulation and coding scheme, controlled UL power, etc.) is selected for the radio channel condition associated with a WTRU. Furthermore, retransmissions, based on HARQ feedback, may be controlled by the scheduler, and, in a case of (e.g., if needed) avoiding (e.g., reducing) HARQ round-trip time delays, repeated transmissions may be (e.g., also) scheduled (however, while reducing spectral efficiency). In a case of dynamic DL scheduling, transmission may be initiated (e.g., immediately) on condition that (e.g., upon, when, according to, based on, etc.) DL data becoming available in a base station (BS) (e.g., gNB).

Figure 5:
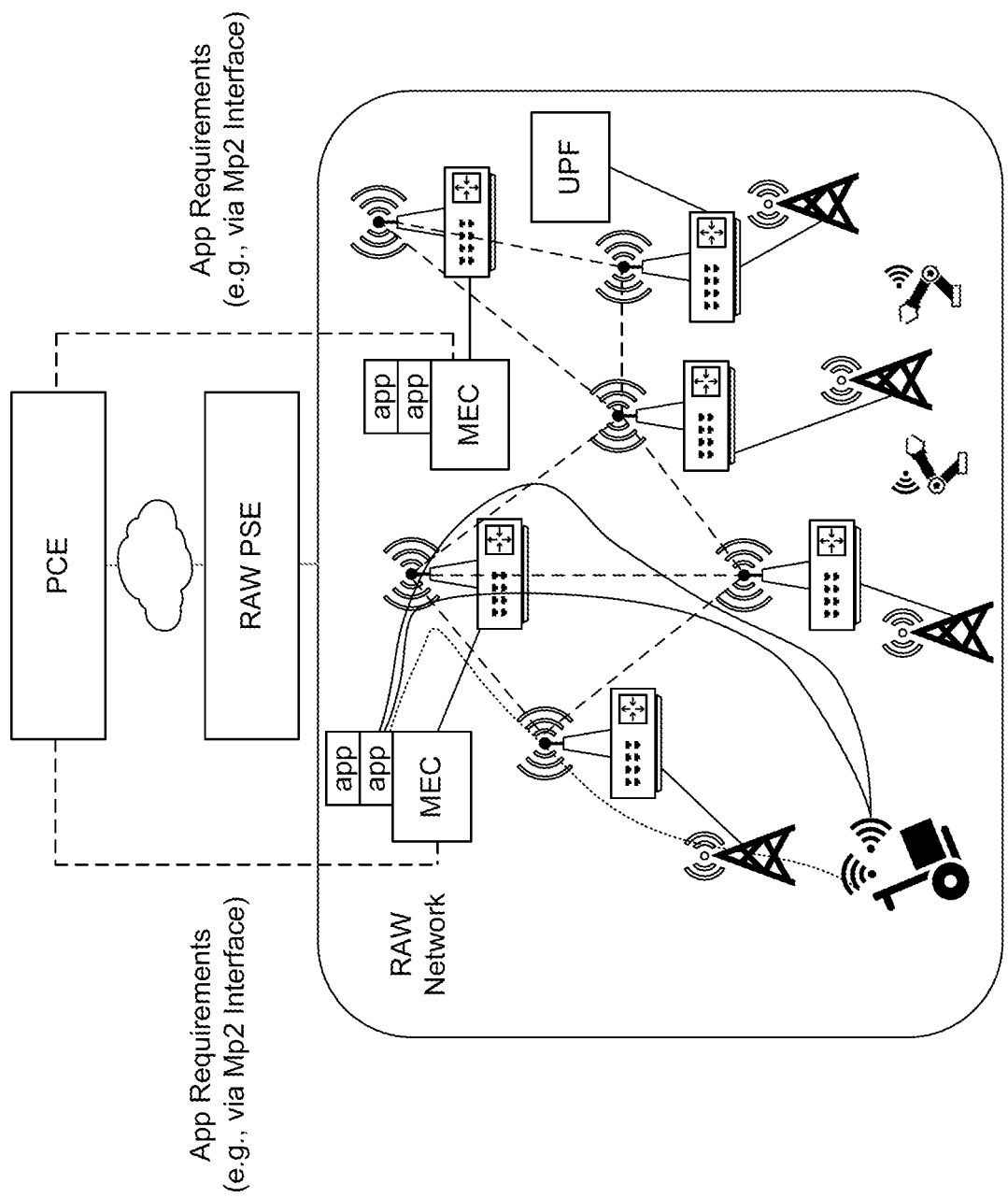
FIG. 5 is a diagram illustrating a scenario including MEC, RAW and 5G networking in an industrial environment having WTRUs, according to embodiments.

FIG. 5 is a diagram illustrating a scenario including MEC, RAW and 5G networking in an industrial environment having WTRUs, according to embodiments.

According to embodiments, for example, in view of the above discussion of MEC, 5G networks, and RAW, there are (e.g., non-limited) problems and/or use cases for consideration, for example, as shown in FIG. 5. In a (e.g., use) case of 5G ultra reliable and low latency communications (URLLC), among uses for (e.g., "verticals" requiring, scenarios for, requirements for, applying of, etc.) URLLC features, uses (e.g. use cases) of Industry 4.0 (also referred to as Wireless for Industrial Applications), for example, as shown in FIG. 4, may be addressed (e.g., applicable) with respect to MEC, 5G networks, and RAW (i.e., is probably the use with more short-term potential/need). As understood (e.g., conventionally), such a case (e.g., scenario) may (e.g., also) call for RAW solutions, as cables are not that suitable for robots and mobile vehicles typically used in factories. Such a case (e.g., scenario) may be a (e.g., very) natural scenario for MEC deployments, as bounded and very low latencies are needed between the robots and physical actuators and the control logic managing them.

FIG. 5 illustrates, according to embodiments, a scenario including a factory where multiple robots and (mobile) automated guided vehicles (AGVs) may be wirelessly connected. According to embodiments, control applications may run in an edge environment/network (e.g., implemented as MEC applications) and may need (e.g., require, need, etc.) bounded low latencies and a guaranteed availability, for example, regardless of mobility of WTRUs (e.g., terminals) and/or changing wireless conditions. According to embodiments, an heterogeneous wireless mesh network may (e.g., be used to) provide connectivity inside a factory, for example, as depicted in FIG. 5, which (e.g., also) depicts MEC and 5G deployment scenarios identified by ETSI MEC. Such a case (e.g., scenario) includes a wireless domain, including and/or involving multiple MEC platforms to provide (e.g., ensure) low latency to applications, for example, by hosting (e.g., being able to host) MEC applications in several locations, and dynamically migrate applications (e.g., apps), for example, while WTRUs move around. In such a case, a serving MEC platform may no longer be capable of meeting the latency requirements.

In view of conventional (e.g., networking) standards, a MEC platform(s) (e.g., would have to) interact with a PCE for data plane requests and updates, which may (e.g., tremendously) limit guaranteeing real-time forwarding decisions, as such interaction may make it challenging and/or not possible to manage forwarding decisions in real-time or near-real time. According to embodiments, a role of a PSE may be considered with respect to RAW solutions and approaches, for example, as considered by the IETF. According to embodiments, a PSE, which computes, at a short time scale, which of the available paths (e.g., tracks) computed by a PCE may (e.g., should) be used per flow/packet and also determines which PAREO functions may be used, for example, in order to provide a flow with required availability and reliability features.

The PSE may interact with a PCE and with RAW nodes, for example, so that such perform (e.g., sets-up, configures, instantiates, etc.) the required per-flow state, for example, to recognize the flow and determine a forwarding policy to be applied. Such RAW forwarding decisions may be distributed among (e.g., necessary) nodes using in-band signaling (e.g., extending Segment Routing, BIER-TE, DETNET tagging, etc.), and/or may be taken (e.g., performed) autonomously by each forwarding node locally. For example, such decisions may be made according to a node's knowledge of the status of the network, for example, gained via operations, administration and management/maintenance (OAM) RAW-specific mechanisms, out of the scope of the current disclosure.

Referring to FIG. 5, according to embodiments, a scenario depicting an industrial environment includes different nodes that are wirelessly connected to provide connectivity to several stationary and/or mobile terminals (e.g., robots). Industrial environments (e.g., factories, warehouses, etc.) provide an (e.g., good example of) scenarios wherein reliability and/or availability are critical. Ensuring such in wireless heterogeneous and multi-hop networks may (e.g., require) use multiple paths, using PAREO functions, and (e.g., even) using dual and/or multiple connectivity. In such industrial environments, WTRU (e.g., terminal, UE, client, etc.) mobility may increase challenges for guaranteeing certain reliability and availability levels, for example, in a case of dynamic and fast changes that WTRU mobility may need (e.g., require) at a data plane level. Such short-time scale forwarding decisions needed (e.g., required) to ensure reliability and availability in consideration of WTRU mobility may not be managed in a case where MEC platforms (e.g., can) only interact with the data plane through the PCE.

A PCE may route (e.g., be responsible for routing) computation and maintenance (e.g., signaling, messaging, etc.) in a network and a PCE may be (e.g., typically) a centralized entity and may reside outside a network. A PCE may (e.g., is meant to) compute and establish redundant paths. However, a PCE may not to be sensitive and/or reactive to transient changes, and may not be capable of ensuring a certain level of reliability and availability in a wireless heterogeneous mesh network, for example, in a case where some of the nodes (e.g., WTRUs, end terminals) may be mobile. As considered conventionally (e.g., in/with currently standardized solutions), a MEC platform only interacts with a RAW network through the PCE, (e.g., most possibly) through an Mp2 reference point defined by ETSI MEC.

A Mp2 reference point is defined between the MEC platform and the data plane of a virtualization infrastructure, for example, to instruct the data plane on how to route traffic among applications, networks, services, etc. According to conventional solutions, the Mp2 reference point is not further specified by ETSI MEC, however, it may be used by conventional solutions, for example, to allow for MEC to request the data plane on the RAW network a certain behavior (e.g., in terms of availability and reliability) for MEC application (i.e., which may be interchangeably referred to herein as any of a MEC app, MEC apps, app, and/or apps) traffic flows. In a case of conventional solutions, the PCE is an entry point for configuring and managing the RAW network (see FIG. 5), for example, through the Mp2 reference point. It may be noted that the PCE may reside outside the RAW network, and in such a case, a path between the RAW network and the PCE may be expensive and slow (e.g., the path may (need to) traverse the whole RAW network). Further, reaching to (e.g., communicating with) the PCE may also be slow in regard to the speed of events that affect the forwarding operation at the radio layer.

Furthermore, a (e.g., conventional) MEC architecture, for example, as currently defined by ETSI in the whitepaper, does not have a component (e.g., a RAW-aware component) for considerations associated with (e.g., designed to deal with, the specifics of) an heterogeneous wireless multi-hop networks, such as a RAW network. Thus, conventional ETSI MEC architecture may be (e.g., very) limited in terms of what a MEC app (i.e., a MEC application, or MEC apps, e.g., through the MEC platform) requests to the data plane of an heterogeneous wireless multi-hop network. That is, such a lack of a RAW-aware component in the ETSI MEC architecture prevents any enhancement at either the MEC side (e.g., MEC app migrations triggered by RAW status updates) or the RAW side (e.g., PAREO function updates triggered by MEC app/UE mobility).

According to embodiments, in view of the above discussed (e.g., use) cases, scenarios, considerations, problems, etc.), there is a need for a (e.g., new) RAW-enabled (e.g., RAW-aware) component, for example, to be included in the ETSI MEC architecture. According to embodiments, a RAW-enabled component may enable a more direct interaction between a MEC platform and a RAW network, for example, allowing the MEC platform to notify events and/or request actions to the RAW network more quickly (e.g., than in a conventional ETSI MEC architecture). According to embodiments, providing a RAW-aware component may involve challenges, for example, such as a RAW PSE having to understand the needs from (e.g., the currently running) MEC applications, so that the RAW PSE may properly configure the RAW nodes in view of a data plane providing required reliability and availability.

According to embodiments, as discussed hereinbelow, direct interaction (e.g., communication, signaling, etc.) between MEC platform(s) and RAW PSE(s) may be provided, for example, to address problems and/or shortcomings discussed above, and/or to address any of the following: (1) what changes are required at the ETSI MEC and RAW architectures in terms of new components and interface extensions?; (2) how can MEC apps send a request to the RAW network regarding what they need for reliability and availability, while allowing for management of forwarding decisions in real-time or near-real time, as required? (3) how can a RAW PSE proactively compute the required actions in a case of MEC app migration and/or mobility?; and (4) how can changes at the RAW network trigger actions at the MEC level? According to embodiments, the disclosure/discussion below provides (e.g., proposes) any of features, elements, operations, solutions, etc., for integrating a RAW PSE with 3GPP RAN PAREO capabilities, for example, by having (e.g., newly defining) a new interface between (e.g., a device, entity, WTRU, node, etc. providing and/or performing operations of) a RAW PSE and the ORAN specified RAN intelligence controller.

Figure 6:
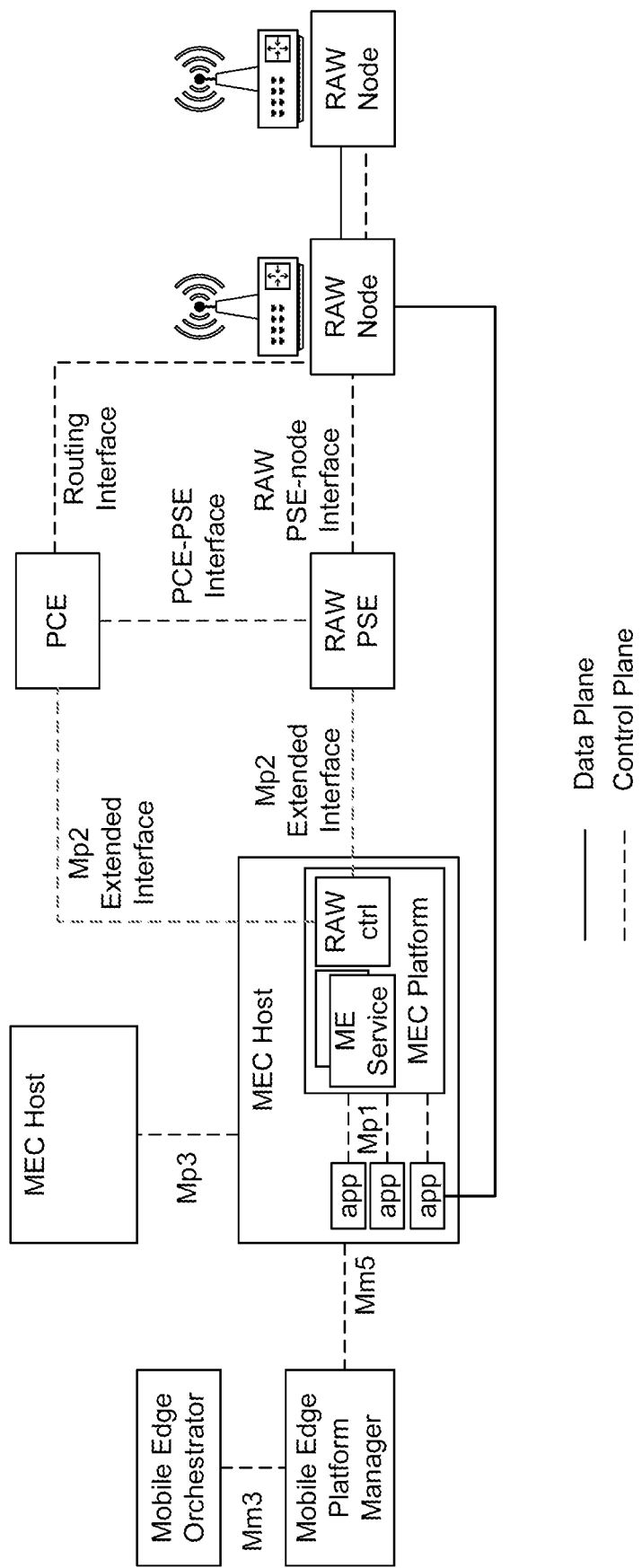
FIG. 6 is a diagram illustrating (e.g., new) RAW ctrl and extended semantics over an interface between the MEC system and the RAW PSE, according to embodiments.

FIG. 6 is a diagram illustrating (e.g., new) RAW ctrl and extended semantics over an interface between the MEC system and the RAW, according to embodiments.

According to embodiments, there may be a (e.g., new, unconventional, proposed, etc.) entity referred to as any of a RAW controller or a RAW ctrl entity. According to embodiments, as discussed hereinbelow, a RAW ctrl may be an entity (e.g., responsible for) computing what to instruct a RAW PSE, for example, according to requirements of MEC apps. According to embodiments, a RAW ctrl may make (e.g., take) decisions at a MEC side (e.g., migration of apps), for example, according to information associated with a RAW network status. According to embodiments, in a case of a RAW ctrl, there may be (e.g., new, added, etc.) interactions and/or interface semantics that is, for example, as a result of the introduction of the RAW ctrl. According to embodiments, such (e.g., new, added, etc.) interactions and/or interface semantics may be used over/via and/or associated with, for example, over the existing Mp2 reference point. However, the present disclosure is not limited thereto. That is, according to embodiments, such (e.g., new, added, etc.) interactions and/or interface semantics discussed hereinbelow may be used over and/or associated with any suitable and/or similar reference point.

According to embodiments, such (e.g., new, proposed, etc.) interactions and semantics may be terminated, for example, at any of the PCE and the RAW PSE, according to requirements of the MEC apps. According to embodiments, in a case of near real-time coordination and control between a MEC and RAW mechanisms, the interactions may be between the RAW ctrl and the RAW PSE. According to embodiments, the deployment discussed above, for example, referring to FIGS. 5 and 6, may be (e.g., mainly) referred to hereinbelow, for example, because it is the one that allows for near real-time updates on the forwarding plane. Furthermore, according to embodiments, an alternative deployment model in which the RAW ctrl interacts with a PCE may (e.g., also be) possible, for example, though only supporting non real-time interactions.

According to embodiments, (e.g., new) MEC-RAW interface semantics and/or extensions, for example, as shown in FIG. 6, may allow a MEC platform to issue requests to a RAW network, for example, through/via a RAW PSE, to allow for behavior as needed and/or required by MEC apps. According to embodiments, (e.g., new) semantics of an interface between a MEC platform and a RAW PSE, for example, any of Mp2 and Mx2, may (e.g., do) not be limited to (e.g., only) serving to convey the requests, and may also (e.g., be used to) synchronize a status and topology of a RAW (e.g., or relevant portion of a) network. According to embodiments, such synchronizing may enable (e.g., performing of) real-time or near-real time forwarding decisions. According to embodiments, for example, as discussed hereinbelow, there may be different signaling diagrams for (e.g., the most) relevant procedures.

MEC Application Request for RAW

Figure 7:
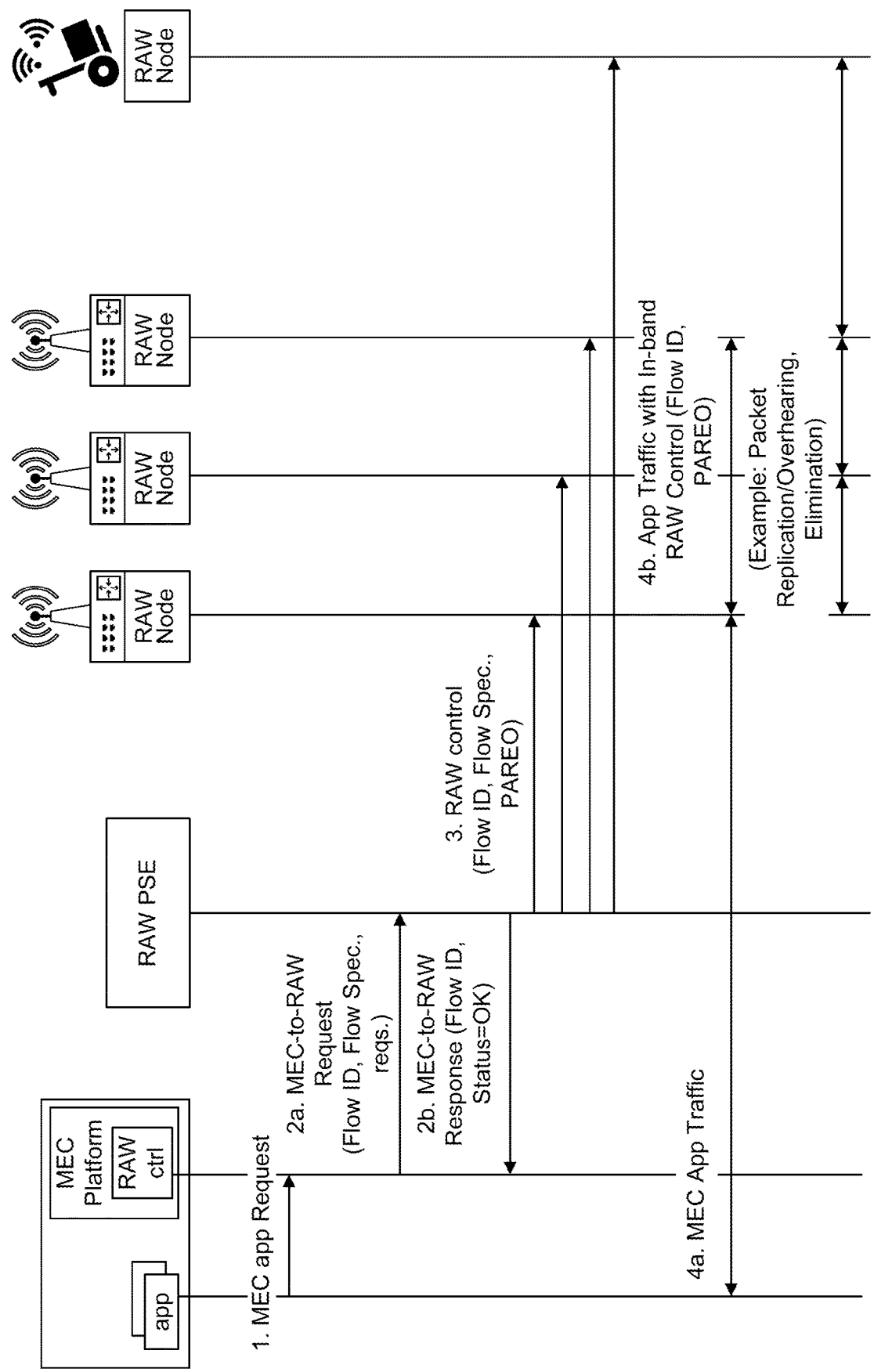
FIG. 7 is a diagram illustrating a MEC app (e.g., application) requesting RAW (e.g., a RAW network), according to embodiments.

FIG. 7 is a diagram illustrating a MEC app (e.g., application) requesting RAW (e.g., a RAW network), according to embodiments.

According to embodiments, there may be interface extensions and/or signaling procedures for a MEC app, for example, enabling (e.g., needed to enable) describing and requesting the MEC app's needs, for example, in terms of availability and reliability. According to embodiments, as discussed hereinbelow, wireless network conditions may (e.g., also) have an impact (e.g., back) on the MEC platform (e.g., by triggering the migration of the MEC app). According to embodiments, referring to FIG. 7, an signaling flow may include a (e.g., certain) MEC app requesting a (e.g., given) behavior for treatment of packets associated with (e.g., generated by) the MEC app. According to embodiments, in a case of an industrial wireless application scenario (e.g., an industrial environment as discussed above) may be used for describing an interface and/or specified interactions.

According to embodiments, a MEC platform may include (e.g., is enhanced with) a RAW ctrl entity that is a RAW-aware component within the MEC architecture enabling (e.g., the required) interactions with the RAW network, for example, through a RAW PSE. According to embodiments, in such a case, MEC apps may do any of the following: (i) adapt to RAW conditions (e.g., in a case where requested reliability and/or availability is not possible), and (ii) dynamically modify a requested flow forwarding to a RAW network, for example, according to the MEC app and/or mobility conditions. According to embodiments, referring to a signal flow, for example, as shown in FIG. 7, may including any of the following described operations.

According to embodiments, as a first operation, a MEC app, for example, which is going to be consumed/used by a WTRU (e.g., or, although not illustrated, a set/group of WTRUs), may specify, to a MEC platform, characteristics of traffic generated by the MEC app, and, for example, its associated requirements. According to embodiments, as a second operation, a MEC platform (e.g., the RAW ctrl component/entity), may be RAW-aware and may know characteristics of a deployment (e.g., of a RAN). According to embodiments, such a MEC platform may analyze the characteristics of the MEC app traffic and the provided requirements, and may generate a (e.g., new) request, for example, over a (e.g., new) interface between the MEC platform and the RAW PSE. According to embodiments, such a request may include, among other parameters, any of the following parameters: (1) an ID for a (e.g., given) flow, for example, (e.g., used) for future near real-time update and/or configuration operations on the same flow; (2) a flow specification, for example, describing the characteristics of the packets, and, for example, allowing efficient identification of flow(s) according to any of well-known fields in IPv4, IPv6, and transport layer headers, like TCP and UDP (example of which may be out of the scope of the discussion herein); and (3) requirements of the flow, for example, in terms of reliability and availability.

According to embodiments, as a third operation, a RAW PSE may process a request, and may compute, for example, according to its knowledge of the network (e.g., topology, node capabilities, ongoing flows, etc.) a (e.g., best) way of transmitting the packets over the RAW network (e.g., using the available paths/tracks, previously computed by a PCE). According to embodiments, there may be a case where a RAW PSE realizes (e.g., determines) that it is not possible to provide the requested reliability and availability characteristics, and, in such a case, the RAW PSE may report such (e.g., back) to the MEC platform. In such a case, the MEC platform may issue another (e.g., a new) request having lower/less requirements. According to embodiments, the RAW PSE may send control packets to (e.g., each of) the RAW nodes involved, for example, in order to instruct the RAW nodes on how to deal with the packets belonging to the MEC app flow. According to embodiments, the sending of control packets by the RAW PSE may include any of information: (1) indicating and/or assigning an ID to the flow; (2) instructing an entry point in the RAW network to tag packets with such an ID; and (3) specific PAREO functions to be used by each of the RAW nodes. According to embodiments, such PAREO functions may be signaled to each of the RAW nodes, or just to some of them (e.g., only the entry point), who can then use in-band signaling to specify such.

According to embodiments, as a fourth operation, a MEC app may generate traffic (e.g., see operation 4a in FIG. 7) that arrives at the RAW entry point in the network, which following the instructions of the RAW PSE, encapsulates and tags the packet, and may also include in-band signaling (e.g., using segment routing). According to embodiments, some PAREO functions may be applied to the MEC app traffic packets (e.g., see operation 4b in FIG. 7), for example, to achieve the required levels of reliability and availability. As shown in FIG. 7, packets may be replicated (e.g., by means of wireless overhearing) at one point of the network, and then later duplicated packets may be eliminated.

In a case of conventional MEC and RAW architectures and procedures, which are still at an early stage of specification (e.g., mainly the RAW ones), such a procedure would not be possible. That is, a conventional MEC platform may not support any RAW specific request (e.g., reliability or availability), and does not dynamically adapt at the MEC side (e.g., with changes for the way a MEC app behaves) or on the RAW network (e.g., to adapt to changing requirements from the MEC app, such as those generated because of a nodes' mobility). According to embodiments, in a case of RAW awareness enabled by the RAW ctrl, a MEC platform and the direct interaction with the RAW PSE (e.g., as opposed to the slower and more expensive communications with a PCE), there may be near to real-time and/or real-time forwarding decisions and adaptations. According to embodiments, such may enable (e.g., better) support node/terminal mobility and MEC app migration, for example, as described hereinbelow.

RAW OAM Triggering and MEC App Migration

Figure 8:
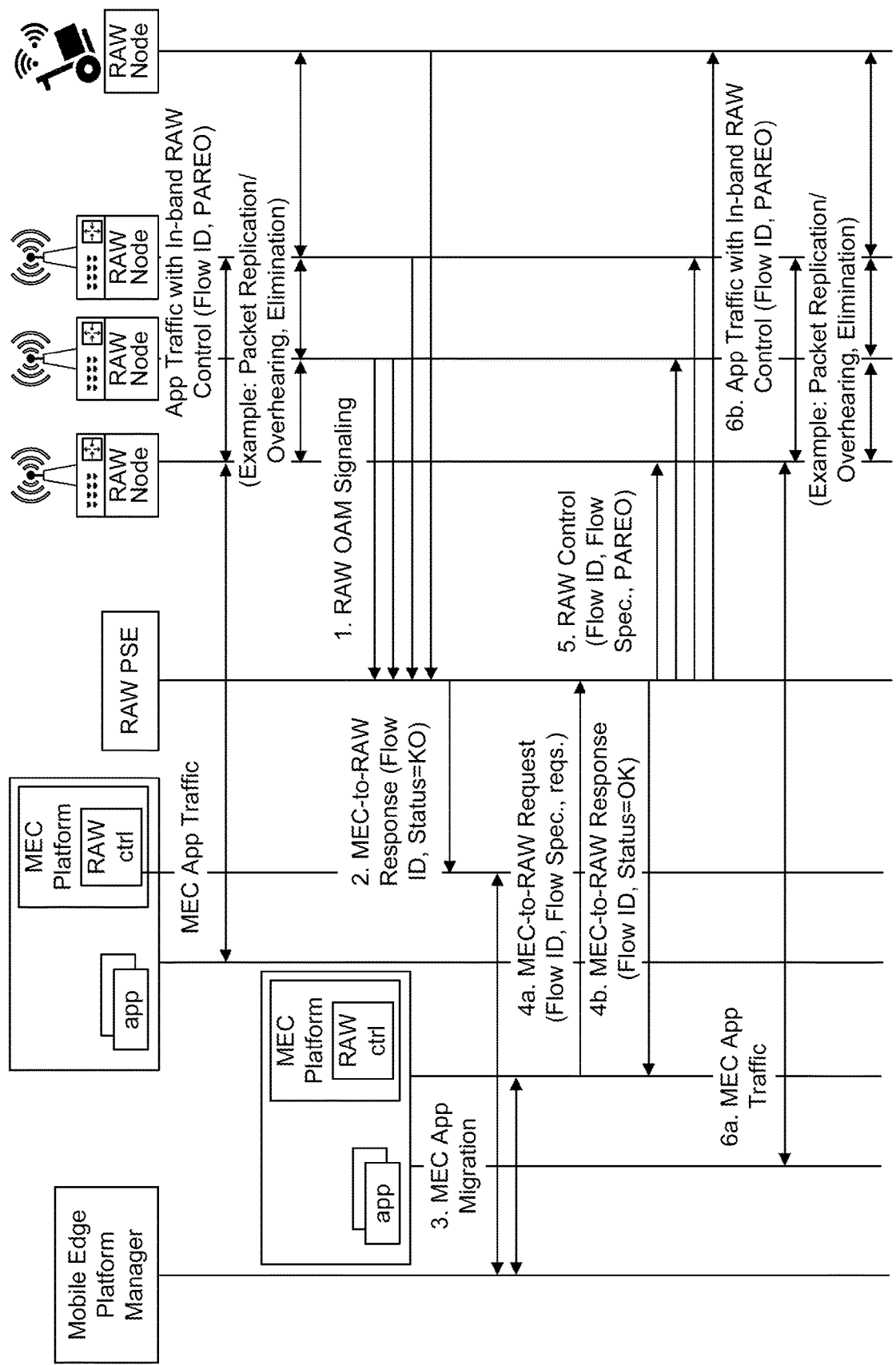
FIG. 8 is a diagram illustrating RAW OAM triggering MEC app migration, according to embodiments.

FIG. 8 is a diagram illustrating RAW OAM triggering MEC app migration, according to embodiments.

According to embodiments, there may be mechanisms for MEC to benefit from RAW OAM information, for example, in a case of (e.g. in order to) trigger migration of a MEC application to a different MEC platform, for example, to ensure that the requirements of the MEC app continue to be met. According to embodiments, referring to FIG. 8, a signaling flow may be associated with changes in a RAW network, which may be detected by (e.g., according to) RAW OAM. According to embodiments, such detected changes in the RAW network may trigger migration of a MEC app. According to embodiments, in such a case, it may be assumed that there is already a MEC app deployed and traffic is already flowing (e.g., procedures discussed above have already taken place). According to embodiments, for example, in such a case, any of the following operations (e.g., see FIG. 8), may be performed.

According to embodiments, as a first operation, RAW OAM signaling may be periodically and reactively exchanged (e.g., transmitted/received) between the RAW nodes and the RAW PSE. According to embodiments, although not discussed herein, there may be a (e.g., specific) mechanism associated with RAW OAM. According to embodiments, as a second operation, in a case where conditions of a (e.g., wireless, RAN, etc.) network get worse (e.g., because of changes in the radio propagation of a critical link) and it is not possible to guarantee required levels of reliability and availability, such may generate (e.g., result in generating) a message from the RAW PSE to the MEC platform, indicating that a given MEC app flow can no longer be served.

According to embodiments, as a third operation, a (e.g., currently) serving MEC platform may trigger a MEC app migration to a different MEC platform. According to embodiments, such MEC app migration may include and/or involve the MEC platform manager. According to embodiments, the MEC platform may provide suggestions regarding where to migrate the MEC app, for example, according to the MEC platform's knowledge of RAW network status, acquired by the RAW ctrl through interactions with the PSE. According to embodiments, as a fourth operation, a MEC platform may generate a new request to the RAW PSE (e.g., see operations/steps 2-4 of FIG. 7). According to embodiments, as a fifth operation, the RAW PSE may process the request, and based on its knowledge of the network, may compute the best way for transmitting the packets over the RAW network. According to embodiments, the RAW PSE may (e.g., then) send control packets to each of the RAW nodes involved. According to embodiments, as a sixth operation, the MEC app may generates traffic arriving at the RAW entry point in the network, which, for example, following instructions/command/configuration from the RAW PSE, may encapsulate and tag the packet.

In a case of conventional MEC architecture, the above described scenario may not be feasible in a case of going through the PCE, as it would be extremely challenging to ensure that the required reactions take place fast enough. Additionally, in such conventional MEC architecture, a MEC platform may not be aware of the RAW network conditions and it may not be possible to optimize the decision regarding the target MEC platform for the app migration.

MEC OAM for RAW Updates

Figure 9:
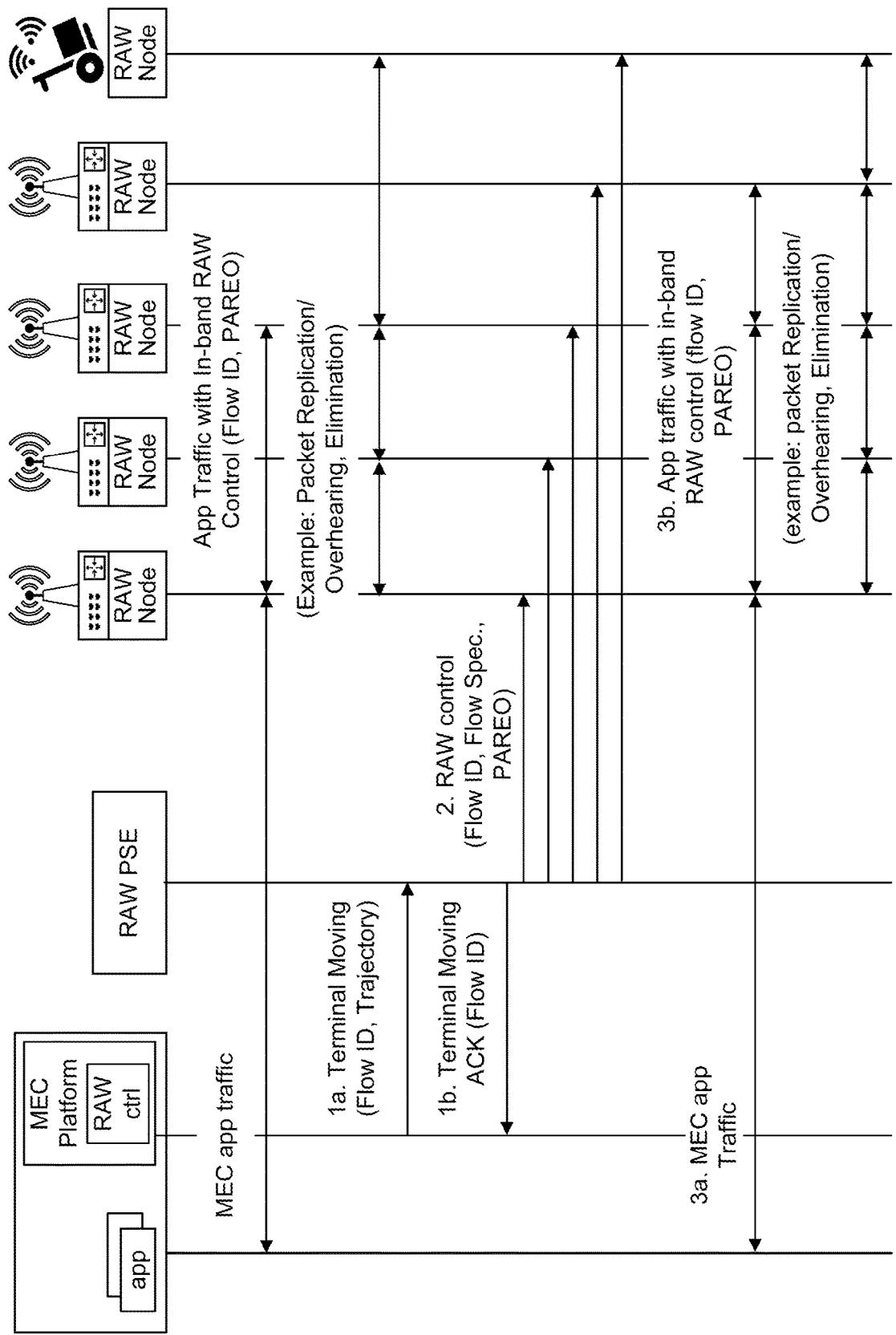
FIG. 9 is a diagram illustrating MEC OAM for RAW updates, according to embodiments.

FIG. 9 is a diagram illustrating MEC OAM for RAW updates, according to embodiments.

According to embodiments, in a case of mobility of the terminals or the nodes hosting the MEC platform hosting a given MEC app, there may be a need for taking actions on the RAW network, for example, for any of: updating paths, applying different PAREO functions, and migrating MEC apps (e.g., involving a change in RAW forwarding). According to embodiments, such a case may trigger a need for mechanisms enabling the RAW PSE to acquire and use MEC OAM information, for example, to update traffic forwarding at the RAW network as needed to adapt to varying conditions (e.g., due to node mobility).

According to embodiments, referring to FIG. 9, there may be a signaling flow for a case of mobility of a node (e.g., a WTRU, a MEC platform hosting a MEC app, etc.) triggering updating of RAW forwarding mechanisms. According to embodiments, (e.g., as in a case of FIG. 8) there may (e.g., already) be a MEC app deployed and traffic may (e.g., already) be flowing (e.g., procedures discussed above have taken place). According to embodiments, for example, referring to FIG. 9, any of the following operations may be performed. According to embodiments, as a first operation, a MEC platform may send a notification (e.g., may notify) that the WTRU consuming (e.g., using, associated with, etc.) a MEC app is moving (and further, other events, such as mobility of the MEC platform itself, may be notified). According to embodiments, such notification may include an expected trajectory, for example, in a case where such may be known or predicted in advance, as it will be in most cases of several scenarios, such as industrial the use cases.

According to embodiments, as a second operation, a RAW PSE may use such information (e.g., received in the notification), for example, to re-compute how to (e.g., best) provide the reliability and availability needed by the MEC app traffic flow. According to embodiments, in such a case, the RAW PSE may update the RAW nodes about the PAREO functions that they have to apply. According to embodiments, as a third operation, (e.g., then) traffic from the MEC app may benefit from updated policies, for example, which may be computed according to the new conditions, and, further, may ensure that the requirements of the MEC app continue to be fulfilled.

RAN Intelligence Controller (RIC)—RAW Interface

Figure 10:
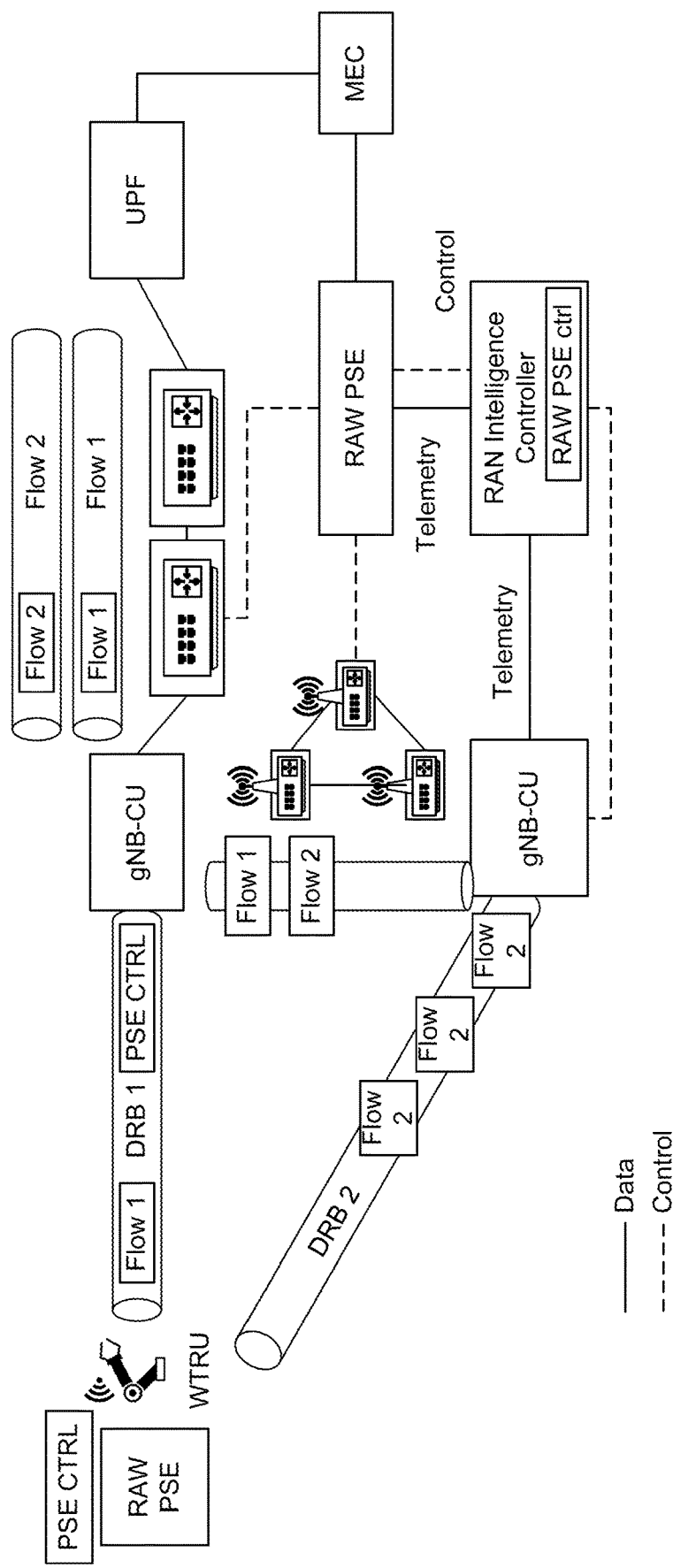
FIG. 10 is a diagram illustrating a RAW PSE connected to a RAW enabled RAN backhaul and RAN Intelligence Controller (RIC), according to embodiments.

FIG. 10 is a diagram illustrating a RAW PSE connected to a RAW enabled RAN backhaul and RAN Intelligence Controller (RIC), according to embodiments.

According to embodiments, there may be any of scenarios and situations having RAW integrated with a 3GPP system and/or an Open-RAN (ORAN) system (e.g., see ORAN alliance system), for example, wherein RAW nodes may be used for wired and/or wireless 3GPP backhaul (e.g., as backhaul nodes). According to embodiments, a 5G RAN may include (e.g., integrate) PAREO capable functions in MAC and PDCP, and in such a case, it may be beneficial to integrate PSE and 3GPP RAN PAREO capabilities together. According to embodiments, for example, referring to FIG. 10, a RAN intelligence controller (RIC) may be connected to a RAW PSE controlling RAW capable backhaul nodes. According to embodiments, such may be done (e.g., achieved) by defining an interface between a RAW PSE and an RAN intelligence controller (RIC), for example a RIC as specified according to an ORAN system.

According to embodiments, there may be at least two approaches for an interface between a RAW PSE and a RIC. According to embodiments, as a first approach, there may be a telemetry interface from the RAN intelligence controller to the RAW PSE. According to embodiments, as a second approach, there may be a (e.g., defined) control interface between the RAW PSE and the RAN intelligence controller. Further, according to embodiments, there may be a hybrid solution, and a control interface for the RIC may send policy configurations as well as telemetry information via the telemetry interface, for example, to assist the RAW PSE about autonomous decisions on backhaul RAW node configurations. According to embodiments, such telemetry may be real-time or non-real time, for example, in which case the RAN intelligence controller may have pre-processed some of the RAN telemetry.

Figure 11:
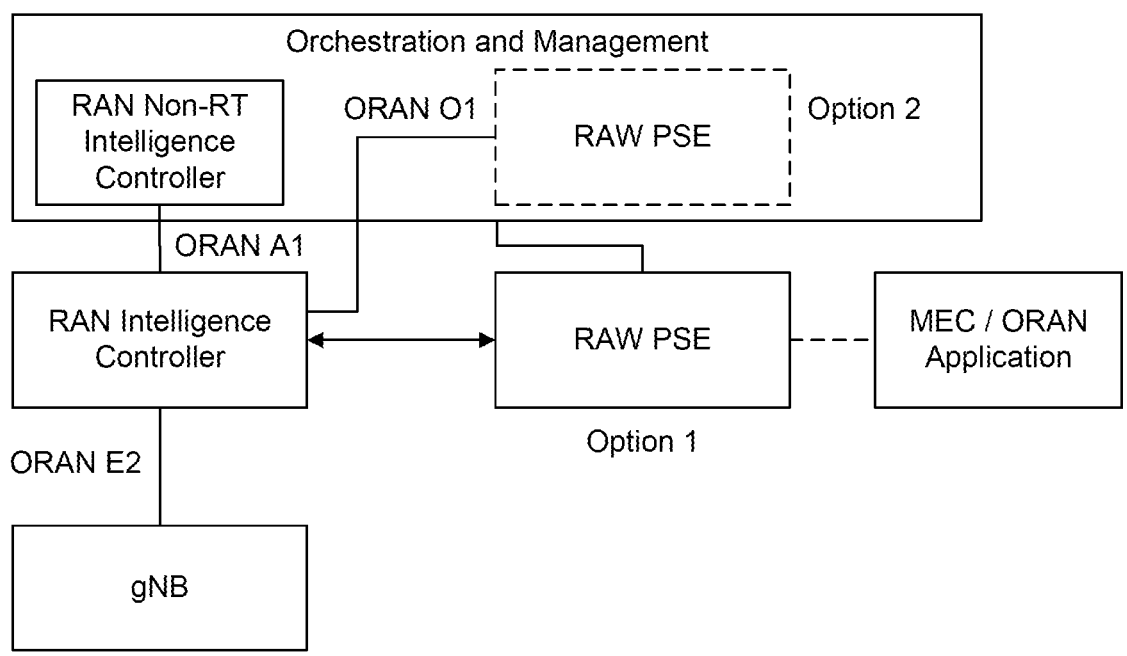
FIG. 11 is a diagram illustrating a RAW PSE and RAN Intelligence Controller Interface, according to embodiments.

FIG. 11 is a diagram illustrating a RAW PSE and RAN Intelligence Controller Interface, according to embodiments.

According to embodiments, referring to FIG. 11, there may be at least two options for a RAW PSE interfacing with a RIC. According to embodiments, as a first option, a RAW PSE may have a standalone interface. According to embodiments, such a standalone interface may be for private NR deployments, for example, wherein the RAW PSE is deployed in/to a virtualized private infrastructure, and wherein the RAW PSE is within the same network as the RIC. According to embodiments, for example, as a second option, a RAW PSE may extend the ORAN O1 interface with control and telemetry capabilities. In such a case, the RAW PSE may be (e.g., still) connected to MEC or to virtualized RAN apps, for example, as described above. In summary, as discussed above, according to embodiments, option 1 is in which a new interface is defined, and option 2 is in which an ORAN O1 interface is extended to support RAW PSE.

According to embodiments, a 5G BS (e.g., an NR gNB) may schedule WTRU UL and DL traffic, for example: (1) to maintain specific reliability and to ensure radio resource efficiency, (2) for fairness in resource usage of the users (e.g., WTRUs), and (3) to enable differentiated treatment of the data flows of the users according to the QoS targets of the flows. According to embodiments, an interface between a RIC and a RAW PSE may be associated with (e.g., may create) an additional dimension to RAN resource scheduling. That is, according to embodiments, in a case of a RAW PSE interface, a RIC may (e.g., be able to) control any of wireless and wired transport links, for example, between distributed BS (e.g., gNB) nodes, and may control PAREO operations, for example, in real-time.

RAW PSE gNB Telemetry Request

Figure 12:
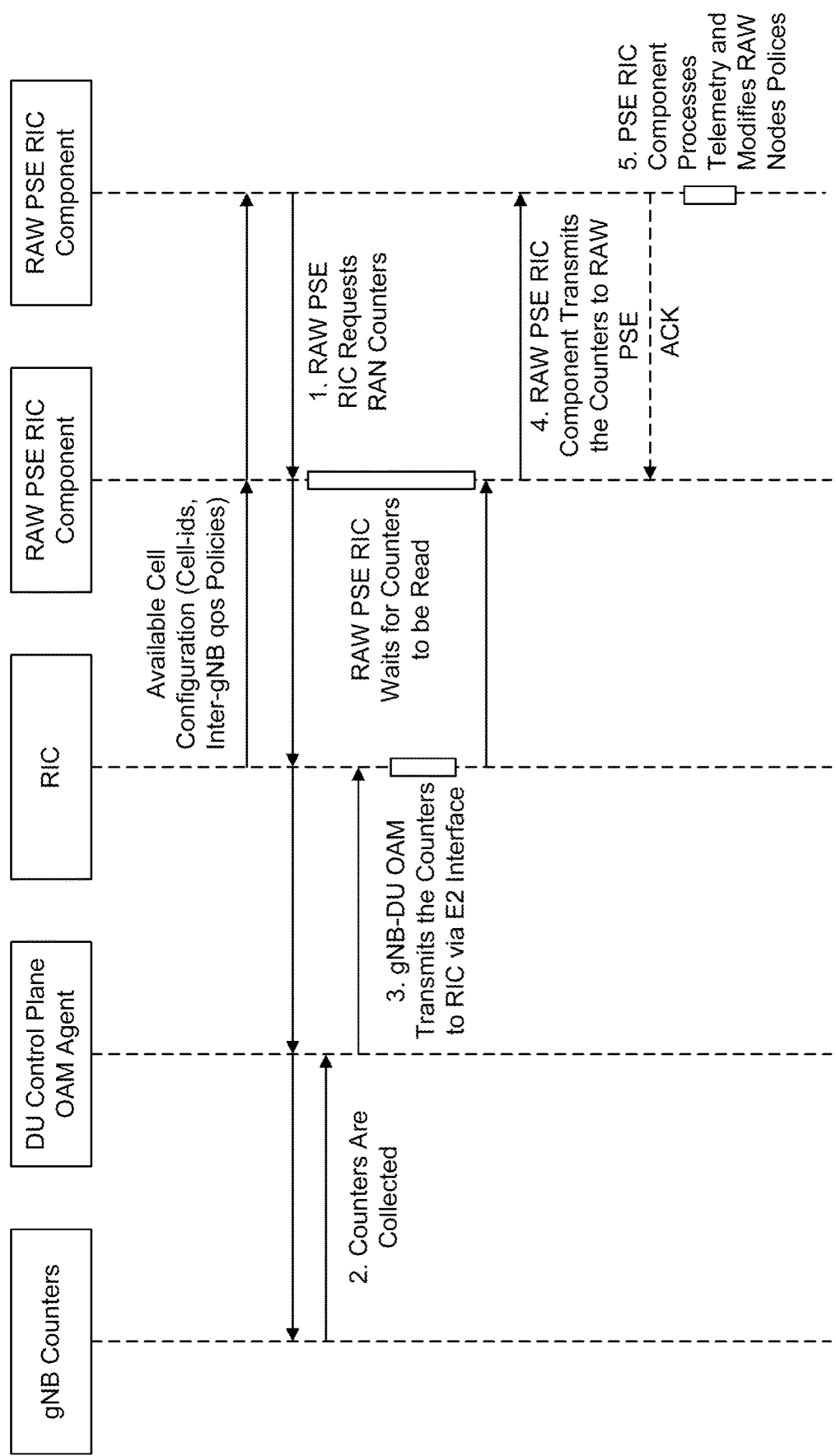
FIG. 12 is a diagram illustrating a RAW PSE requesting gNB telemetry from a RIC, according to embodiments.

FIG. 12 is a diagram illustrating a RAW PSE requesting gNB telemetry from a RIC, according to embodiments.

According to embodiments, a RAW PSE may request telemetry, for example, from a RIC as any of real-time or non-real-time telemetry. According to embodiments, there may be a case having a RAW ctrl being initially configured with BS (e.g., gNB) identifiers (IDs) (i.e., identities (IDs); e.g., cell IDs) and with QoS policies associated with the BS (e.g., cell) IDs. According to embodiments, in a case of a RAW ctrl configured with BS IDs and associated QoS policies, a RAW PSE may identify flows associated with the backhaul links controlled by the RAW nodes. According to embodiments, a RAW controller may be aware of RAW network nodes positions and which RAW nodes are connected to a BS (e.g., a gNB, DUs, etc.). According to embodiments, using such policy information, a RAW PSE may control PAREO operations (e.g., as discussed above) within a RAW network.

According to embodiments, in a case where (e.g., after) a RAW controller has received an initial configuration, including available RAN nodes (e.g., a list of cell IDs) and associated QoS polices, a RAW controller may perform any of the following operations: (1) a RAW ctrl may request BS (e.g., gNB) performance and traffic counters, along with BS/gNB cell identifier (ID) and flow identifiers (IDs) associated with the cell ID; and a RAW ctrl at RIC component may receive the request and forward it to a RIC for fetching the requested performance counters from the gNB; (2) the gNB may collect the counters and may forward them to a BS (e.g., gNB) distributed unit (DU) OAM component; (3) and (4) counters may be transmitted via an E2 interface to the RIC; (5) the RAW ctrl at RIC component may transmit all available counters associated with the cell id and flow identifier to the RAW PSE; and (6) the RAW PSE may processes the telemetry and may modify RAW network policies.

RAW WTRU Policy Configuration Initiated by a RIC

Figure 13:
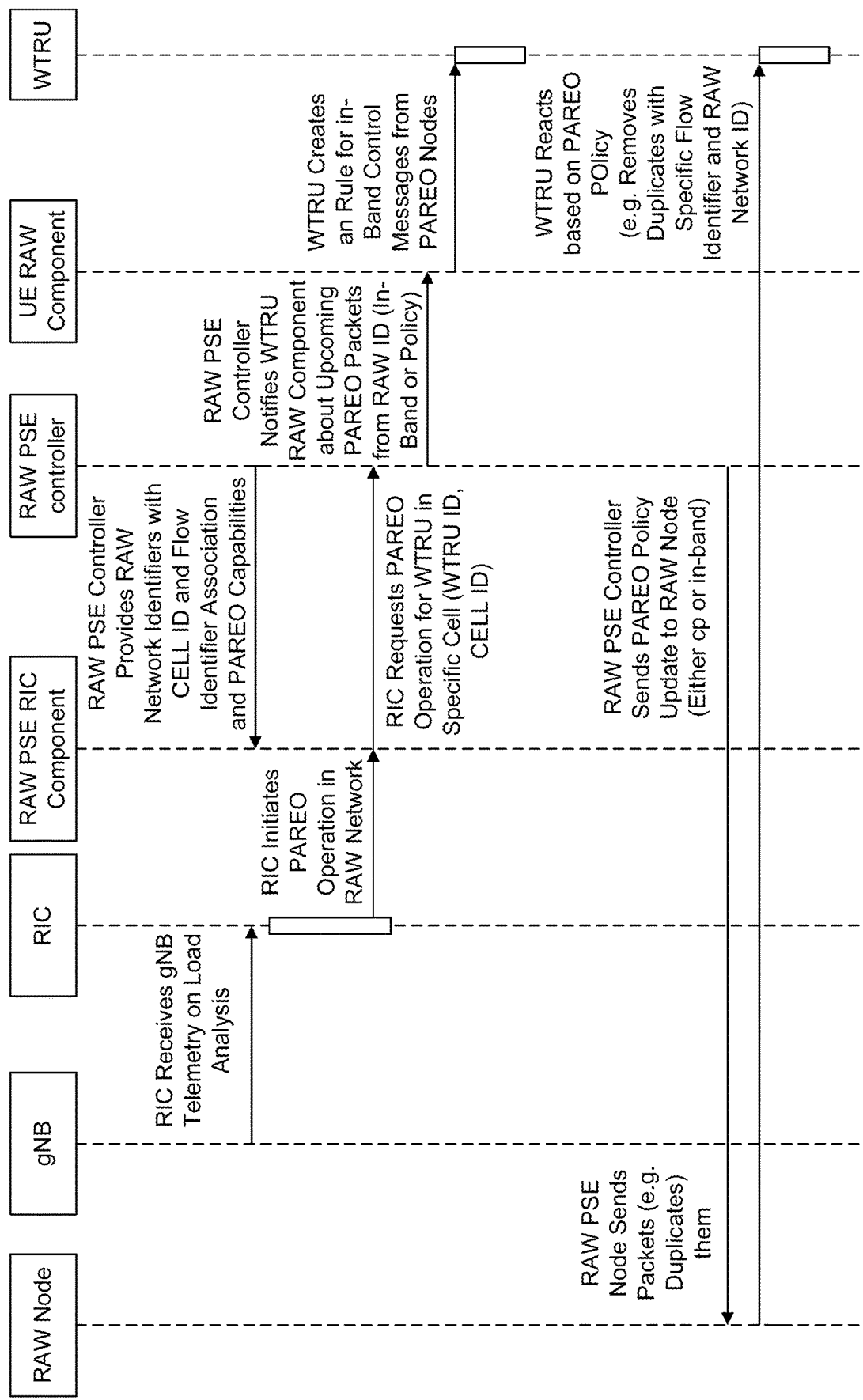
FIG. 13 is a diagram illustrating RIC WTRU PAREO policy configuration including a WTRU starting to react on PAREO policies from a RAN node, according to embodiments.

FIG. 13 is a diagram illustrating RIC WTRU PAREO policy configuration including a WTRU starting to react on PAREO policies from a RAN node, according to embodiments.

According to embodiments, a RIC may offload (e.g., may be capable of offloading) PAREO operations to the RAW network. Referring to FIG. 13, a RIC may collect and analyze telemetry from distributed gNBs, and, accordingly, the RIC may request a RAW policy update on a PAREO network. According to embodiments, for example, based on telemetry originating from multiple RAN BSs/gNBs (e.g., or distributed components of a single BS/gNB), the RAN RIC may transmit RAW PAREO policy messages to a RAW PSE component. According to embodiments, such policy information may contain any of flow and node identifiers and policies related to PAREO operations.

According to embodiments, a RAW controller may provide RAW network identifiers to the RAW ctrl at RIC component, for example, to allow the RAW ctrl at RIC component to match cell IDs with RAW network IDs (e.g., to identify RAW network end points as gNB end points). According to embodiments, in view of such, any of the following operations (e.g., referring to FIG. 13) may be performed. According to embodiments, as a first operation, a gNB may transmits operational telemetry to RIC. According to embodiments, as a second operation, a RIC may decide to initiate PAREO operation in a RAW network (e.g., to increase reliability). According to embodiments, as a third operation, a RIC RAW component may receive any of a WTRU ID, a cell ID, and an associated flow ID, and associated policy information. According to embodiments, the RIC RAW component may translate RIC WTRU IDs to WTRU RAW network IDs, for example, so that the RAW controller may (e.g., be able to) communicate with the RIC. According to embodiments, the RAW PSE RIC controller may receive (e.g., also) the RIC policy related to the WTRU and may translate the policy, for example, into a RAW controller understandable format. According to embodiments, as a fourth operation, a RAW controller may transmit a RAW policy to a WTRU RAW component. According to embodiments, such may be done either via control signaling or sending an in-band message that contains an originating flow ID and that indicates a pre-defined policy behavior.

According to embodiments, as a fifth operation, the RAW controller may send a policy update to the RAW network node (e.g., as any of in-band or control-plane signaling/messaging). According to embodiments, as a sixth operation, the WTRU RAW component may create a RAW rule for the WTRU, for example, to terminate PAREO operations. According to embodiments, as a seventh operation, the RAW network node may execute PAREO operations (e.g., replicates a packet and associates it with a PAREO header). According to embodiments, as an eighth operation, the WTRU may receive a PAREO packet with a matching header (e.g., RAW node IDs from a specific RAW node with a flow ID) and may execute the WTRU policy (e.g., terminating replicate packet). According to embodiments, a BS (e.g., gNB) may be able to transmit all or a subset of the above information via an ORAN E2 interface to the RIC. According to embodiments, the RAW ctrl at RIC component may be (e.g., then) either processing and/or transmitting telemetry related to RAN inter-gNB scheduling.

Conclusion

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments (e.g., only) and is not intended to be limiting. As used herein, when referred to herein, the terms "user equipment" and its abbreviation "UE" may mean (1) a wireless transmit and/or receive unit (WTRU), such as described infra; (2) any of a number of embodiments of a WTRU, such as described infra; (3) a wireless-capable and/or wired-capable (e.g., tetherable) device configured with, inter alia, some or all structures and functionality of a WTRU, such as described infra; (4) a wireless-capable and/or wired-capable device configured with less than all structures and functionality of a WTRU, such as described infra; or (5) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra-Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method performed by a Multi-access Edge Computing (MEC) platform associated with a wireless communication network, the method comprising:
   generating a request for a MEC application operating within the MEC platform, the request comprising reliability and availability characteristics of a data flow to one or more reliable and available wireless (RAW) nodes;
   transmitting the request to a RAW path selection engine (PSE);
   receiving, from the RAW PSE, an indication of an available wireless communication network path for the data flow;
   transmitting information to the one or more RAW nodes using the available wireless communication network path for the data flow;
   receiving an indication that the data flow cannot further meet the reliability and availability characteristics; and
   transmitting an indication to migrate the MEC application from the MEC platform to another MEC platform.

2. The method of claim 1, wherein generating the request of the MEC application comprises generating the request further comprising any of (1) an identifier of the data flow and (2) a flow specification describing characteristics of packets for the data flow.

3. The method of claim 2, wherein the characteristics of the packets for the data flow include defining packets according to any known fields of any of IPv4, IPv6, and transport layer headers of any of TCP and UDP.

4. The method of claim 1, wherein receiving, from the RAW PSE, an indication of the available wireless communication network path for the data flow comprises receiving the indication of the available wireless communication network path for the data flow between the MEC application of the MEC platform and the one or more RAW nodes.

5. The method of claim 1, wherein transmitting information to the one or more RAW nodes using the available wireless communication network path for the data flow further comprises exchanging packets between the MEC application of the MEC platform and the one or more RAW nodes.

6. The method of claim 1, wherein receiving an indication that the data flow cannot further meet the reliability and availability characteristics comprises receiving an indication of any of a change in the network associated with the one or more RAW nodes and a mobility of the MEC platform.

7. The method of claim 1, wherein transmitting an indication to migrate the MEC application from the MEC platform to another MEC platform comprises transmitting to a MEC platform manager an indication to migrate the MEC application to another MEC platform.

8. The method of claim 7, wherein a selection of another MEC platform is made using information from interactions with the PSE.

9. A Multi-access Edge Computing (MEC) platform associated with a wireless communication network, the MEC platform comprising circuitry, including a transmitter, a receiver, a processor, and memory, the MEC platform configured to:
- generate a request for a MEC application operating within the MEC platform, the request comprising reliability and availability characteristics of a data flow to one or more reliable and available wireless (RAW) nodes;
- transmit the request to a RAW path selection engine (PSE);
- receive, from the RAW PSE, an indication of an available wireless communication network path for the data flow;
- transmit information to the one or more RAW nodes using the available wireless communication network path for the data flow;
- receive an indication that the data flow cannot further meet the reliability and availability characteristics; and
- transmit an indication to migrate the MEC application from the MEC platform to another MEC platform.

10. The MEC platform of claim 9, wherein the request further comprises any of (1) an identifier of the data flow and (2) a flow specification describing characteristics of packets for the data flow.

11. The MEC platform of claim 10, wherein the characteristics of the packets for the data flow include defining packets according to any known fields of any of IPv4, IPv6, and transport layer headers of any of TCP and UDP.

12. The MEC platform of claim 9, wherein the available wireless communication network path for the data flow is between the MEC application of the MEC platform and the one or more RAW nodes.

13. The MEC platform of claim 9, wherein the information transmitted to the one or more RAW nodes comprises packets exchanged between the MEC application of the MEC platform and the one or more RAW nodes.

14. The MEC platform of claim 9, wherein the indication that the data flow cannot further meet the reliability and availability characteristics comprises an indication of any of: a change in the network associated with the one or more RAW nodes and a mobility of the MEC platform.

15. The MEC platform of claim 9, wherein the indication to migrate the MEC application from the MEC platform to another MEC platform is transmitted to a MEC platform manager.

16. The MEC platform of claim 15, wherein the indication to migrate the MEC application is based on a selection using information from interactions with the PSE.

17. The MEC platform of claim 9, wherein the MEC platform comprises a wireless receive/transmit unit.

18. A non-transient computer-readable storage medium comprising instructions which when executed by a computer, cause a Multi-access Edge Computing (MEC) platform to carry out a method, the method comprising:
- generating a request for a MEC application operating within the MEC platform, the request comprising reliability and availability characteristics of a data flow to one or more reliable and available wireless (RAW) nodes;
- transmitting the request to a RAW path selection engine (PSE);
- receiving, from the RAW PSE, an indication of an available wireless communication network path for the data flow;
- transmitting information to the one or more RAW nodes using the available wireless communication network path for the data flow;
- receiving an indication that the data flow cannot further meet the reliability and availability characteristics; and
- transmitting an indication to migrate the MEC application from the MEC platform to another MEC platform.

19. The non-transient computer-readable storage medium of claim 18, wherein transmitting an indication to migrate the MEC application from the MEC platform to another MEC platform comprises transmitting to a MEC platform manager an indication to migrate the MEC application to another MEC platform.

20. The non-transient computer-readable storage medium of claim 18, wherein receiving, from the RAW PSE, an indication of the available wireless communication network path for the data flow comprises receiving the indication of the available path for the data flow between the MEC application of the MEC platform and the one or more RAW nodes.

* * * * *